(12) United States Patent
Akaishi

(10) Patent No.: US 6,722,973 B2
(45) Date of Patent: Apr. 20, 2004

(54) APPARATUS FOR THE SIMULATED REARING OF A MOVABLE LIVING OBJECT

(75) Inventor: Susumu Akaishi, Tokyo (JP)

(73) Assignee: Wiz Co., Ltd., Tokyo (JP)

( * ) Notice: Subject to any disclaimer, the term of this patent is extended or adjusted under 35 U.S.C. 154(b) by 0 days.

(21) Appl. No.: 09/986,927

(22) Filed: Nov. 13, 2001

(65) Prior Publication Data

US 2002/0132654 A1 Sep. 19, 2002

(30) Foreign Application Priority Data

Mar. 16, 2001 (JP) .......................... 2001-075928

(51) Int. Cl.[7] .............. A63F 13/00; A63F 9/24; G06F 17/00; G06F 19/00
(52) U.S. Cl. ............... 463/1; 463/40; 703/11; 706/58; 446/143; 446/175
(58) Field of Search ............... 463/1–9, 40–42; 700/86, 11, 1; 706/58; 446/143, 175

(56) References Cited

U.S. PATENT DOCUMENTS

| | | | | |
|---|---|---|---|---|
| 6,227,966 B1 | * | 5/2001 | Yokoi ........................... | 463/1 |
| 6,273,815 B1 | * | 8/2001 | Stuckman et al. ............ | 463/9 |
| 6,449,518 B1 | * | 9/2002 | Yokoo et al. ................. | 700/86 |
| 2002/0082077 A1 | * | 6/2002 | Johnson et al. .............. | 463/30 |
| 2002/0098879 A1 | * | 7/2002 | Rheey .......................... | 463/1 |

* cited by examiner

Primary Examiner—Teresa Walberg
Assistant Examiner—Robert Mendoza
(74) Attorney, Agent, or Firm—Swidler Berlin Shereff Friedman, LLP

(57) ABSTRACT

There is provided a rearing simulation apparatus which can dramatically produce further rearing pleasure for a player by allowing the player to rear and grow an imaginary living body of the rearing simulation apparatus and constructing the rearing simulation apparatus not only to display information but also to move or run, the rearing simulation apparatus comprising a memory means for memorizing control data related to the rearing of the imaginary living body, a control means for reading out control data corresponding to an input related to the rearing when the input is entered from the input means and executing control processing related to the rearing of the imaginary living body based on the control data so read out, a display means for displaying rearing information related to the imaginary living body and an operating means adapted to be operated by the information obtained from the control means, whereby the results of the rearing by the rearing means are displayed on the display means and the operating means is operated based on the results of the rearing by the rearing means.

10 Claims, 24 Drawing Sheets

◇ Short Distance ・・・ 120cm　　／10a

| 40cm | 40cm | 40cm |
|---|---|---|
| Former Portion | Intermediate Portion | Latter Portion |

◇ Intermediate Distance ・・・ 180cm　　／10b

| 60cm | 60cm | 60cm |
|---|---|---|
| Former Portion | Intermediate Portion | Latter Portion |

◇ Long Distance ・・・ 240cm　　／10c

| 80cm | 80cm | 80cm |
|---|---|---|
| Former Portion | Intermediate Portion | Latter Portion |

FIG. 14

| Type D | Type C | Type B | Type A |        |
| Type C | Type B | Type A | Type A | Type A |
| Type C | Type B | Type B | Type A | Type B |
| Type D | Type C | Type B | Type B | Type C |
| Type D | Type D | Type C | Type C | Type D |

FIG. 15

[SECOND GENERATION]

| SPEED MAX VALUE FOR TYPE A | 18 MEMORIES |
|---|---|
| SPEED MAX VALUE FOR TYPE B | 16 MEMORIES |
| SPEED MAX VALUE FOR TYPE C | 14 MEMORIES |
| SPEED MAX VALUE FOR TYPE D | 12 MEMORIES |

[THIRD GENERATION]

| SPEED MAX VALUE FOR TYPE A | 24 MEMORIES |
|---|---|
| SPEED MAX VALUE FOR TYPE B | 22 MEMORIES |
| SPEED MAX VALUE FOR TYPE C | 20 MEMORIES |
| SPEED MAX VALUE FOR TYPE D | 18 MEMORIES |

[FOURTH GENERATION]

| SPEED MAX VALUE FOR TYPE A | 30 MEMORIES |
|---|---|
| SPEED MAX VALUE FOR TYPE B | 28 MEMORIES |
| SPEED MAX VALUE FOR TYPE C | 26 MEMORIES |
| SPEED MAX VALUE FOR TYPE D | 24 MEMORIES |

*FIG. 16*

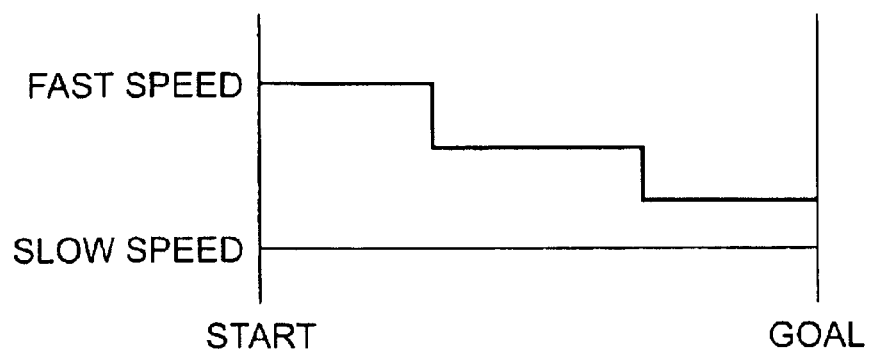
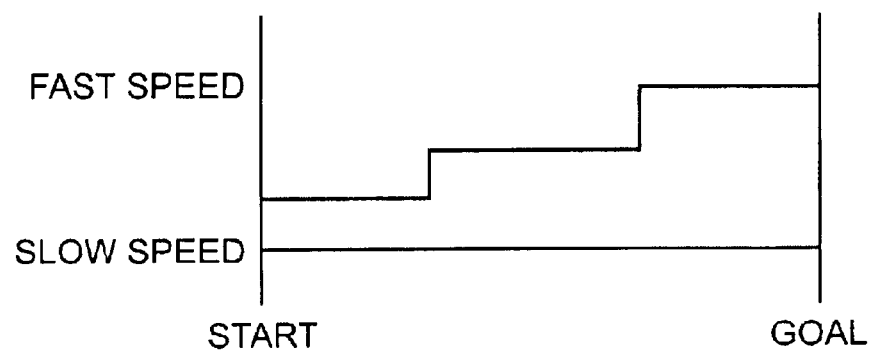
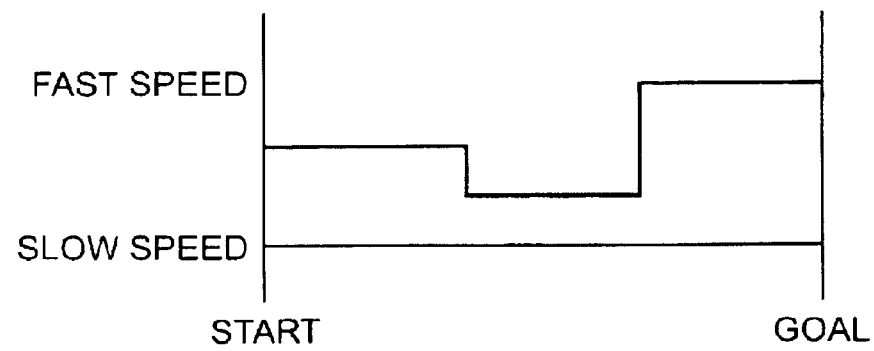
FIG. 18

APPARATUS FOR THE SIMULATED REARING OF A MOVABLE LIVING OBJECT

BACKGROUND OF THE INVENTION

1. Field of the Invention

The present invention relates to a rearing simulation apparatus in which a player rears and grows an imaginary living body of the rearing simulation apparatus and displays the results of the rearing and growing of the imaginary living body on a display means of the rearing simulation apparatus or activates an operating means.

2. Description of the Related Art

Conventionally, there have been proposed and sold various types of electronic games in which a pet such as a cat or dog is reared within predetermined screens. An example of the conventional electronic games disclosed in Japanese Unexamined Patent Publication (Kokai) No. 10-232595 is a rearing simulation apparatus in which a player responds to and deals with appeals or requests from an imaginary living body displayed on the screen to take care of or train the imaginary living body for growing the same.

When this electronic game was introduced into the market place, players could enjoy the game sufficiently from the viewpoint of loving the pet while rearing and growing the imaginary living body within the electronic game and displaying the degree of growing on the liquid crystal screen.

However, the electronic game provided no further dramatic effect, and therefore there have been demands from the players for development of a rearing simulation apparatus provided with dramatic effects with which playing pleasure can further be increased.

To this end, the present invention was made in view of the situation provided by the conventional game apparatus and an object thereof is to provide a rearing simulation apparatus in which the player rears and grows an imaginary living body of the rearing simulation apparatus and can enjoy further dramatic effects by adapting the rearing simulation apparatus to be activated relative to the player in addition to the displaying effect.

SUMMARY OF THE INVENTION

With a view to attaining the object, according to a first aspect of the present invention, there is provided a rearing simulation apparatus comprising a rearing means for rearing an imaginary living body and an input means for implementing the rearing of the imaginary living body, wherein a player responds to and deals with appeals or requests from the imaginary living body to take care of or train the imaginary living body for growing the same, the rearing simulation apparatus being characterized by provision of a memory means for memorizing control data related to the rearing of the imaginary living body, a control means for reading out control data corresponding to an input related to the rearing when the input is entered from the input means and executing control processing related to the rearing of the imaginary living body based on the control data so read out, a display means for displaying rearing information related to the imaginary living body and an operating means adapted to be operated by the information obtained from the control means, whereby the results of the rearing by the rearing means are displayed on the display means and the operating means is operated based on the results of the rearing by the rearing means.

According to the first aspect of the present invention, the imaginary living body grows while being taken care of or trained, and the results of the growing are displayed on the display means and the operating means is operated based on the results of the growing, whereby the rearing simulation apparatus can be provided which dramatically produces further rearing pleasure for the player.

In addition, according to a second aspect of the present invention, there is provided a rearing simulation apparatus as set forth in the first aspect of the invention, wherein the operating speed of the operating means is varied based on the results of the rearing by the rearing means.

According to the second aspect of the present invention, the imaginary living body grows while being taken care of or trained, and the operating means is operated based on the results of the growing, whereby the rearing simulation apparatus can be provided which dramatically produces further rearing pleasure for the player.

According to a third aspect of the present invention, there is provided a rearing simulation apparatus as set forth in the first or second aspect of the invention, wherein the rearing simulation apparatus is formed such that the external appearance thereof imitates that of a figured matter and wherein leg portions or tires are provided on the rearing simulation apparatus so as to make the apparatus movable.

According to the third aspect of the present invention, the rearing simulation apparatus is provided with the leg portions or tires so that the rearing simulation apparatus becomes movable, whereby the rearing simulation apparatus can be provided which dramatically produces further rearing pleasure for the player.

According to a fourth aspect of the present invention, there is provided a rearing simulation apparatus as set forth in any of the first to third aspects of the invention, wherein the player sets the number of times of operation of the operating means for the imaginary living body based on information on an optional distance entered by the player from the input means so as to make the imaginary living body run the optional distance.

According to the fourth aspect of the present invention, the player can get to know the rearing status of the imaginary living body by setting a running distance to be covered by the rearing simulation apparatus based on the optional distance information entered by the player and measuring time to be taken by the imaginary living body before it has covered the distance so set, whereby the rearing simulation apparatus can be provided which dramatically produces further rearing pleasure for the player.

According to a fifth aspect of the present invention, there is provided a rearing simulation apparatus as set forth in any of the first to fourth aspects of the invention, wherein the rearing simulation apparatus holds a capability characteristic for varying the operating speed of the operating means, and wherein in a case where the player tries to make the rearing simulation apparatus run an optional distance, the operating speed of the operating means is varied by reflecting the capability characteristic and results of the rearing by the rearing means.

According to the fifth aspect of the present invention, in a case where the player tries to make the rearing simulation apparatus run based on the entered optional distance information, the operating speed is varied while the rearing simulation apparatus runs the optional distance in accordance with the capability characteristic and the result of the rearing of the imaginary living body, whereby the rearing simulation apparatus can be provided which dramatically produces further rearing pleasure for the player.

According to a sixth aspect of the present invention, there is provided a rearing simulation apparatus as set forth in any of the first to fifth aspects of the invention, wherein a switch for confirming the condition of the imaginary living body is provided on the rearing simulation apparatus, whereby with the switch being operated the condition of the imaginary living body is informed of through the operation of the rearing simulation apparatus by activating the operating means based on information on the rearing.

According to the sixth aspect of the present invention, in a case where the switch disposed on the rearing simulation apparatus for confirming the condition of the imaginary living body is depressed by the player in order for him or her to be aware of the condition of the imaginary living body, the rearing simulation apparatus operates and informs the player of the current condition of the imaginary living body which is needed for rearing, whereby the rearing simulation apparatus can be provided which dramatically produces further rearing pleasure for the player.

According to a seventh aspect of the present invention, there is provided a rearing simulation apparatus as set forth in any of the first to sixth aspects of the invention, wherein the imaginary living body so reared and grown can play a computer match against another imaginary living body stored in the memory means.

According to the seventh aspect of the present invention, the player rears and grows the imaginary living body, and the degree of growing of the imaginary living body can be measured by playing the computer match against another imaginary living body stored in the memory means, whereby the rearing simulation apparatus can be provided which dramatically produces further rearing pleasure for the player.

According to an eighth aspect of the present invention, there is provided a rearing simulation apparatus as set forth in any of the first to seventh aspects of the invention, wherein the rearing simulation apparatus comprises a clocking means for allowing the imaginary living body to age, so that the age of the imaginary living body is retained and memorized in the memory means and a connecting means for connecting the rearing simulation apparatus with a different rearing simulation apparatus for communicating information on the imaginary living body and information on a different imaginary living body obtained from the different rearing simulation apparatus in a case where the age of the imaginary living body falls within an optional range, allowing both or either of the imaginary living bodies to change to the same or a different kind of imaginary living body as or from before the connection while retaining the information of the imaginary living body and the information of the different imaginary living body in the memory means, and resetting the age retained in the memory means of the rearing simulation apparatus for change to an optional age.

According to the eighth aspect of the present invention, in a case where the age of the imaginary living body retained in the memory means of the rearing simulation apparatus falls within the optional range, the rearing simulation apparatus is connected with the different rearing simulation apparatus so as to communicate the information on the imaginary living body and the information on the different imaginary living body obtained from the different rearing simulation apparatus via the connecting means so that the rearing information on the respective imaginary living bodies is stored in the memory means of the respective rearing simulation apparatuses, thereby allowing both or either of the imaginary living bodies to change to the same or a different kind of imaginary living body as or from before the connection from the rearing information retained in the memory means of the respective rearing simulation apparatuses. The age of the imaginary living body can also be changed. Thus, the rearing simulation apparatus can be provided which dramatically produces further rearing pleasure for the player.

According to a ninth aspect of the present invention, there is provided a rearing simulation apparatus as set forth in any of the first to eights aspects of the invention, wherein the rearing simulation apparatus comprises an operation stopping means for stopping the operation of the operating means so that the player can stop the operation of the operating means as required.

According to the ninth aspect of the present invention, there is provided the rearing simulation apparatus in which the player can stop the operation of the rearing simulation apparatus when no operation of the rearing simulation apparatus is required, whereby the power consumption can be suppressed.

According to a tenth aspect of the present invention, there is provided a rearing simulation apparatus as set forth in any of the first to ninth aspects of the invention, wherein the rearing simulation apparatus is formed such that the external appearance thereof imitates a racehorse, and wherein a motor or power spring is used for the operating means.

According to the tenth aspect of the present invention, the rearing simulation apparatus has the configuration imitating a racehorse, and the motor or power spring is used for the operating means, whereby the rearing simulation apparatus can be provided which becomes friendlier to the player.

BRIEF DESCRIPTION OF THE DRAWINGS

The invention will be better understood from reading the description which will follow, which is given merely by way of example and made with reference to the appended drawings, in which:

FIG. 14 shows running distances when playing with the rearing simulation apparatus by running the same;

FIG. 15 is a table for use in determining the kind of a succeeding racehorse to be bred;

FIG. 16 shows tables for use in determining a maximum value for the capability of a racehorse to be bred;

FIG. 18 shows charts showing changes in operating speed of the rearing simulation apparatus;

DETAILED DESCRIPTION OF THE INVENTION

Figure 1:
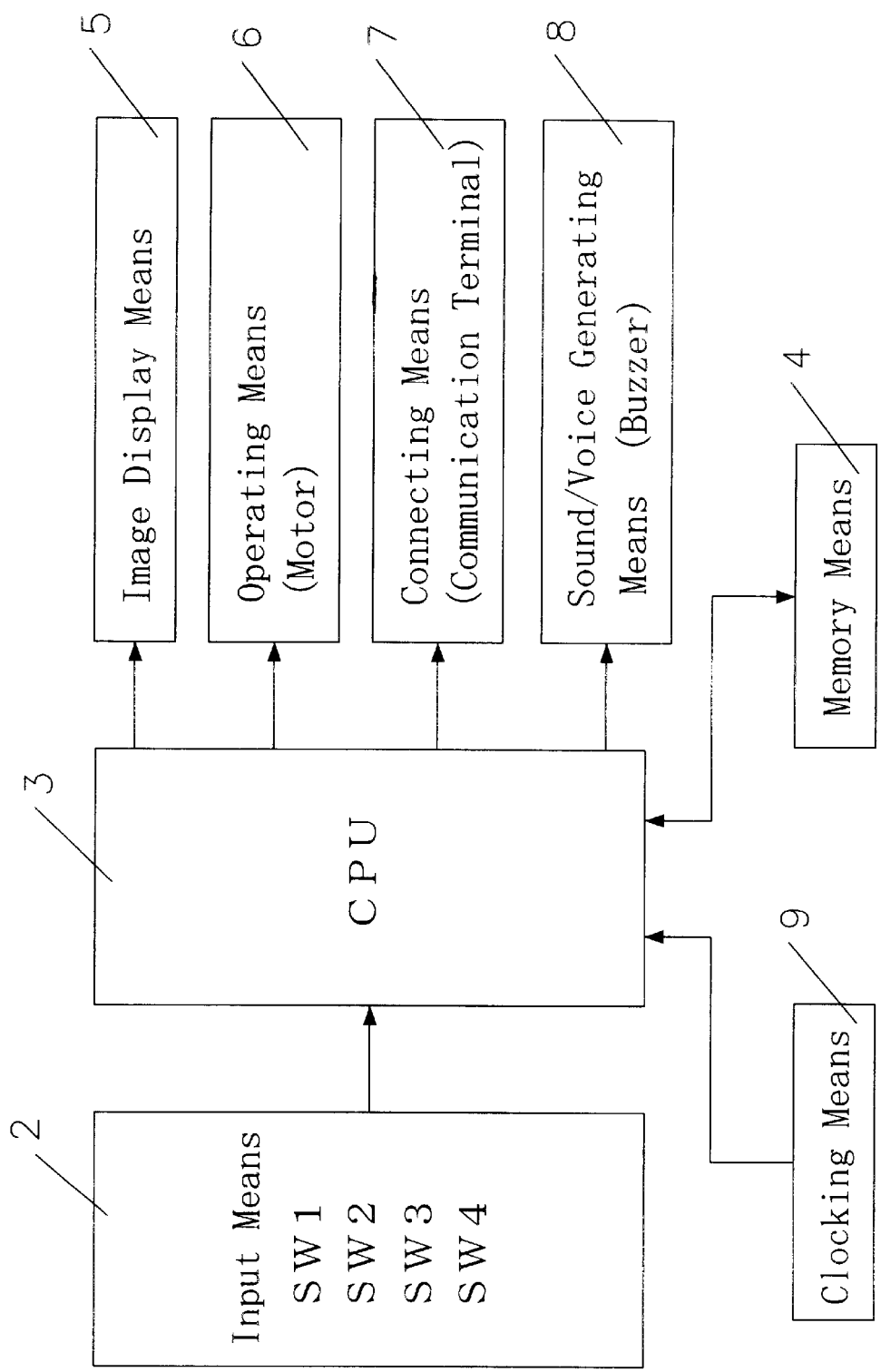
FIG. 1 is a block diagram showing a basic circuit configuration of the present invention.

According to the present invention, there is provided a rearing simulation apparatus comprising a rearing means for rearing an imaginary living body and an input means for implementing the rearing of the imaginary living body, the rearing simulation apparatus being characterized by provision of a memory means for memorizing control data related to the rearing of the imaginary living body, a control means for reading out control data corresponding to an input related to the rearing when the input is entered from the input means and executing control processing related to the rearing of the imaginary living body based on the control data so read out, a display means for displaying rearing information related to the imaginary living body and an operating means adapted to be operated by the information obtained from the control means.

The rearing simulation apparatus is formed such that the external appearance thereof imitates that of a figured matter, and leg portions or tires are provided on the rearing simulation apparatus so as to make the apparatus movable.

The player sets the number of times of operation of the operating means for the imaginary living body based on information on an optional distance entered by the player from the input means so as to make the imaginary living body run the optional distance.

The rearing simulation apparatus holds a capability characteristic for varying the operating speed of the operating means, and in a case where the player tries to make the rearing simulation apparatus run an optional distance, the operating speed of the operating means is varied by reflecting the capability characteristic and results of the rearing by the rearing means.

A switch for confirming the condition of the imaginary living body is provided on the rearing simulation apparatus, whereby with the switch being operated the condition of the imaginary living body is informed of through the operation of the rearing simulation apparatus by activating the operating means based on information on the rearing.

The rearing simulation apparatus comprises a clocking means for allowing the imaginary living body to age and a connecting means for communicating information with a different rearing simulation apparatus, wherein the age of the imaginary living body is retained and memorized in the memory means and the connecting means connects the rearing simulation apparatus with a different rearing simulation apparatus for communicating information on the imaginary living body and information on a different imaginary living body obtained from the different rearing simulation apparatus, in a case where the age of the imaginary living body falls within an optional range, for allowing both or either of the imaginary living bodies to change to the same or a different kind of imaginary living body as or from the imaginary living body while retaining the information of the imaginary living body and the different imaginary living body in the memory means and resetting the age retained in the memory means of the rearing simulation apparatus for change to an optional age.

The rearing simulation apparatus comprises a operation stopping means for stopping the operation of the operating means so that the player can stop the operation of the operating means as required.

The rearing simulation apparatus is formed such that the external appearance thereof imitates a racehorse, and a motor or power spring is used for the operating means.

DESCRIPTION OF THE PREFERRED EMBODIMENT

An embodiment of the present invention will be described in detail below with reference to the appended drawings.

FIG. 1 is a block diagram showing a basic circuit configuration according to the present invention.

In FIG. 1, key inputted signals from key switches SW1, SW2, SW3 of an input means 2 and a tail switch SW4 are sent to a CPU 3. The CPU 3 implements a processing for rearing based on the key inputted information from the input means 2. Inputs to and/or outputs from a memory means 4 in which control data related to the rearing of an imaginary living body is stored are implemented based on processed information and outputs are sent to respective output means. Control data is sent from the CPU 3 to an image display means 5, an operating means 6 and a sound/voice output means 8, whereby sound and/or voice is generated from the sound/voice output means 8, and the rearing status is displayed on the image display means 5 in the form of number or image. In addition, the operating means 6 drives a motor. Furthermore, a connecting means 7 is provided so as to implement a connection with a different rearing simulation apparatus, and a timer or clocking means 9 is also provided for clocking the age of the imaginary living body and appeals to be made to the player.

Thus, according to the present invention, the player can grow the imaginary living body while looking after or training it by operating the input means for rearing so that the player can respond to and deal with appeals or requests from the imaginary living body, and the results of the rearing are displayed on the image display means. Moreover, the rearing simulation apparatus itself is constructed to be operated so as to produce dramatic effects with which the player can enjoy playing with the apparatus further.

Next, an embodiment of rearing the imaginary living body (a racehorse) according to the present invention will be described with reference to FIGS. 2 to 16.

Figure 2:
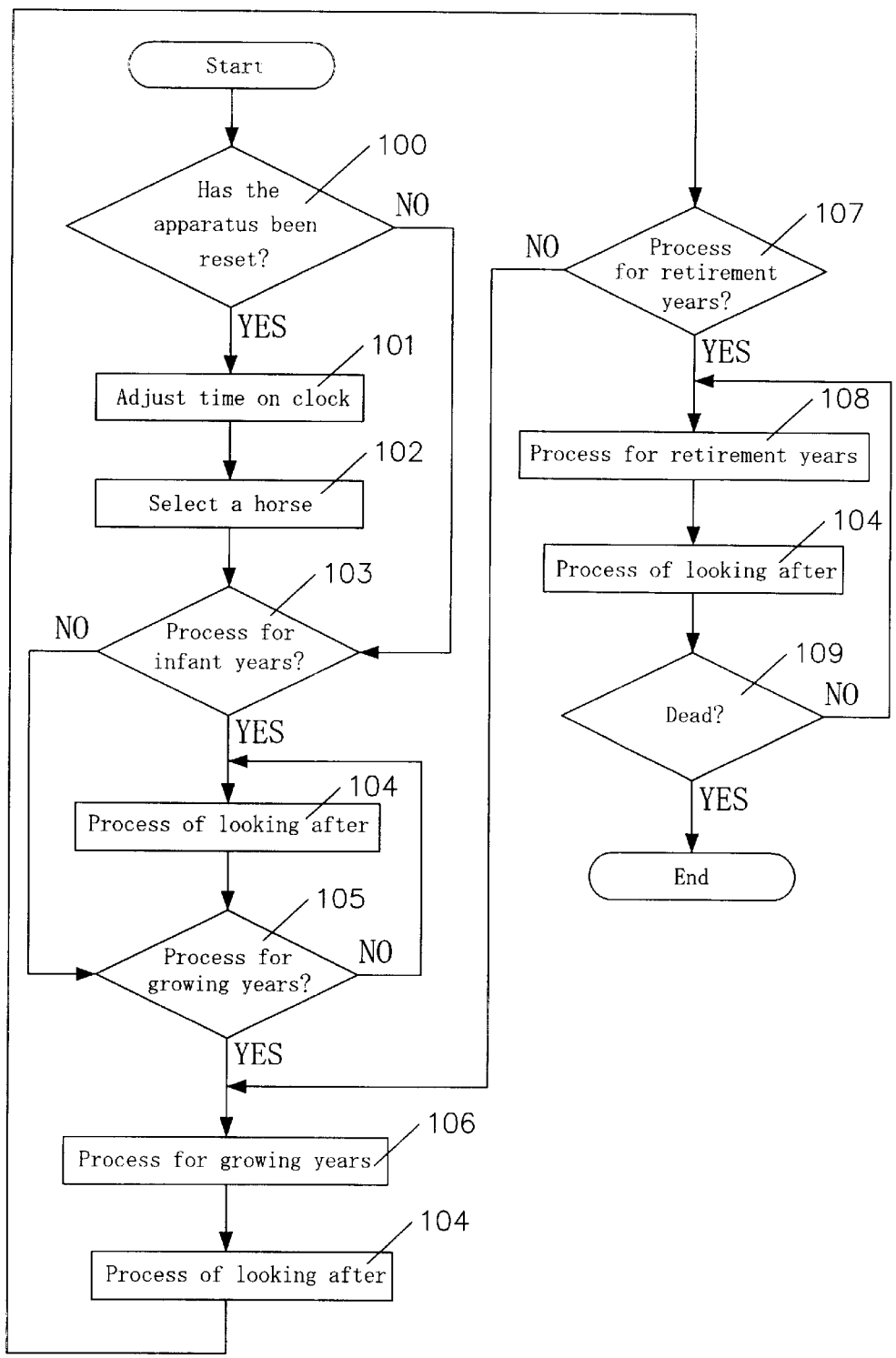
FIG. 2 is a flowchart showing the entirety of rearing of a racehorse.

A flow of the entirety of rearing shown in FIG. 2 will be described.

After start, it is determined in step 100 whether or not an apparatus main body 1 has been reset, and if the apparatus main body has been reset, the flow proceeds to step 101. If the apparatus main body has not been reset, the flow proceeds to step 103. In step 101, a time is set on a clock provided on the apparatus main body.

In step 102, a racehorse is selected. A player selects a racehorse from three types of racehorses. The racehorses differ from each other depending on running characteristics of the horses such as a horse good at dashing from the start to take the lead in the race and continuing to take the lead to the coal, a horse good at making a last spurt to win the race, and a horse fickleness. The horse of the dashing type has a relatively strong dashing force and is best for acceleration at the time of start. The horse of the last spurt type has excellent stamina and competing guts and is good at making a last spurt toward the goal. In addition, the horse of the fickle type has a superior capability to flexibly adapt itself to changes in the environment and can run freely to the condition of the race.

Figure 9:
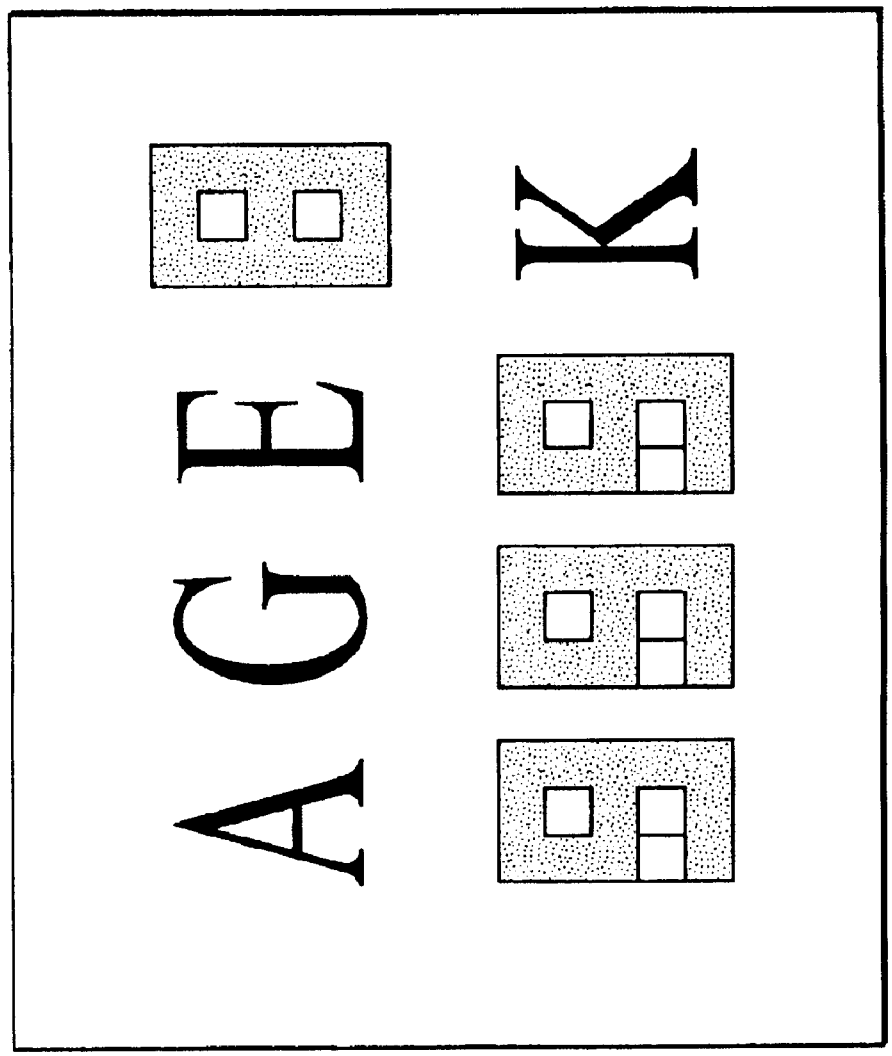
FIG. 9 is a display on the screen showing the age and weight of the racehorse.

After the type of the racehorse has been selected, information indicating the condition of the racehorse is displayed on the screen of the display means. For example, FIG. 9 is an example of display displayed on the screen at a normal time. The age of the racehorse is displayed at an upper part of the display, whereas the weight of the racehorse is displayed at a lower part thereof. For example, AGE8 displayed at the upper part on the screen means that the age of the horserace is 8 years old, whereas 999K displayed at the lower part means that the weight of the racehorse is 999 kilograms. This display of age and weight is displayed at the normal time.

It is determined in step 103 whether or not the racehorse is in its infanthood (younger than 2 years old), and if the racehorse is in its infanthood, a "process of looking after 104" is started, while if the racehorse is as old as or older than 2 years old, the flow proceeds to step 105.

In step 105, it is determined whether or not the racehorse is in its growing years (as old as or older than 2 years old to younger than 5 years old), and in case the racehorse is in its growing period, a "process for growing years 106" and the "process of looking after 104" are started. On the contrary, in case the racehorse does not reach the growing years, the flow proceeds to step 103, whereas the racehorse is over the growing years, then the flow proceeds to step 107.

In step 107, it is determined whether or not the age of the racehorse has reached retirement years (older than 5 years old), and in case the racehorse is in its retirement years, a "process for retirement years 108" and the "process of looking after 104" are started. On the contrary, if the racehorse has not yet reached the retirement years, the flow then proceeds to step 106.

In step 109, it is determined whether or not the racehorse is dead, and in case the racehorse is not dead, the flow proceeds to step 107. On the contrary, the racehorse is determined to be dead, the play becomes over.

Figure 10:
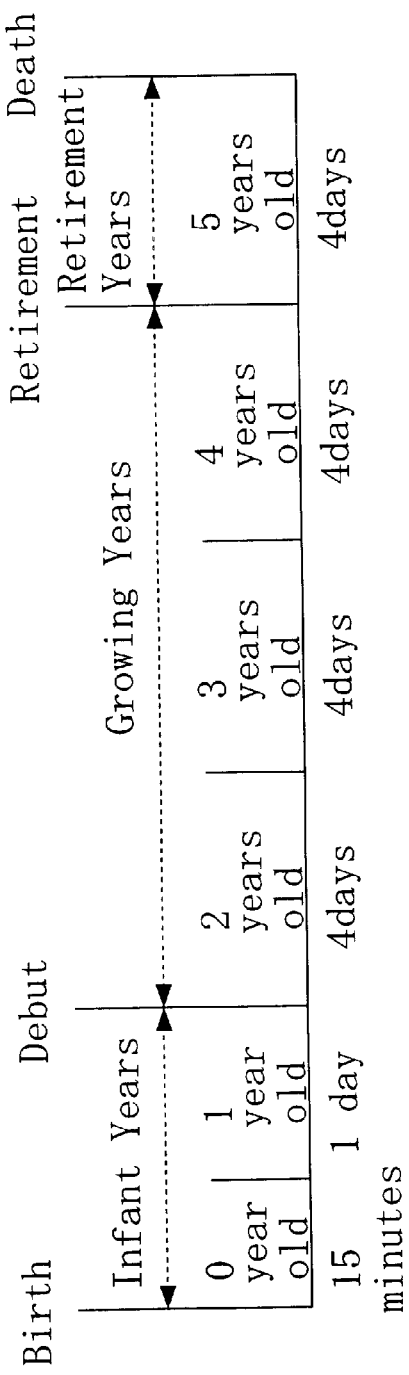
FIG. 10 is a chart showing the process of growing the racehorse.

While only the "process of looking after 104" can be executed while the racehorse is in its infant years (0 to 1 year old), when the racehorse has reached the growing years (2 to 4 years old), the "process for growing years 106" and the "process of looking after 104" can be executed. In addition, when the racehorse is in its retirement years (5 years old or older), the "process for retirement years 108" and the "process of looking after 104" can be executed. Ages of the racehorse shown in FIG. 10 are managed by a clocking means (a clock) provided in the rearing simulation apparatus, wherein the racehorse at the age of 0 reaches the age of 1 after the elapse of 15 minutes, and the racehorse at the age of 1 reaches the age of 2 after the elapse of 1 day.

When it exceeds the age of 2, the racehorse gets 1 year old every time 4 days has elapsed. In addition, the age of the racehorse varies the capability characteristic thereof, as well as the operating speed of the operating means.

In this embodiment, while the racehorse is designed to get old after the elapse of a certain time, the time to be set is optional, and the time may be designed to vary in response to rearing situations of the racehorse. In addition, sensors for temperature, humidity, altitude, and direction may be provided in the rearing simulation apparatus, and the time may be varied depending upon external inputs from these sensors.

Figure 3:
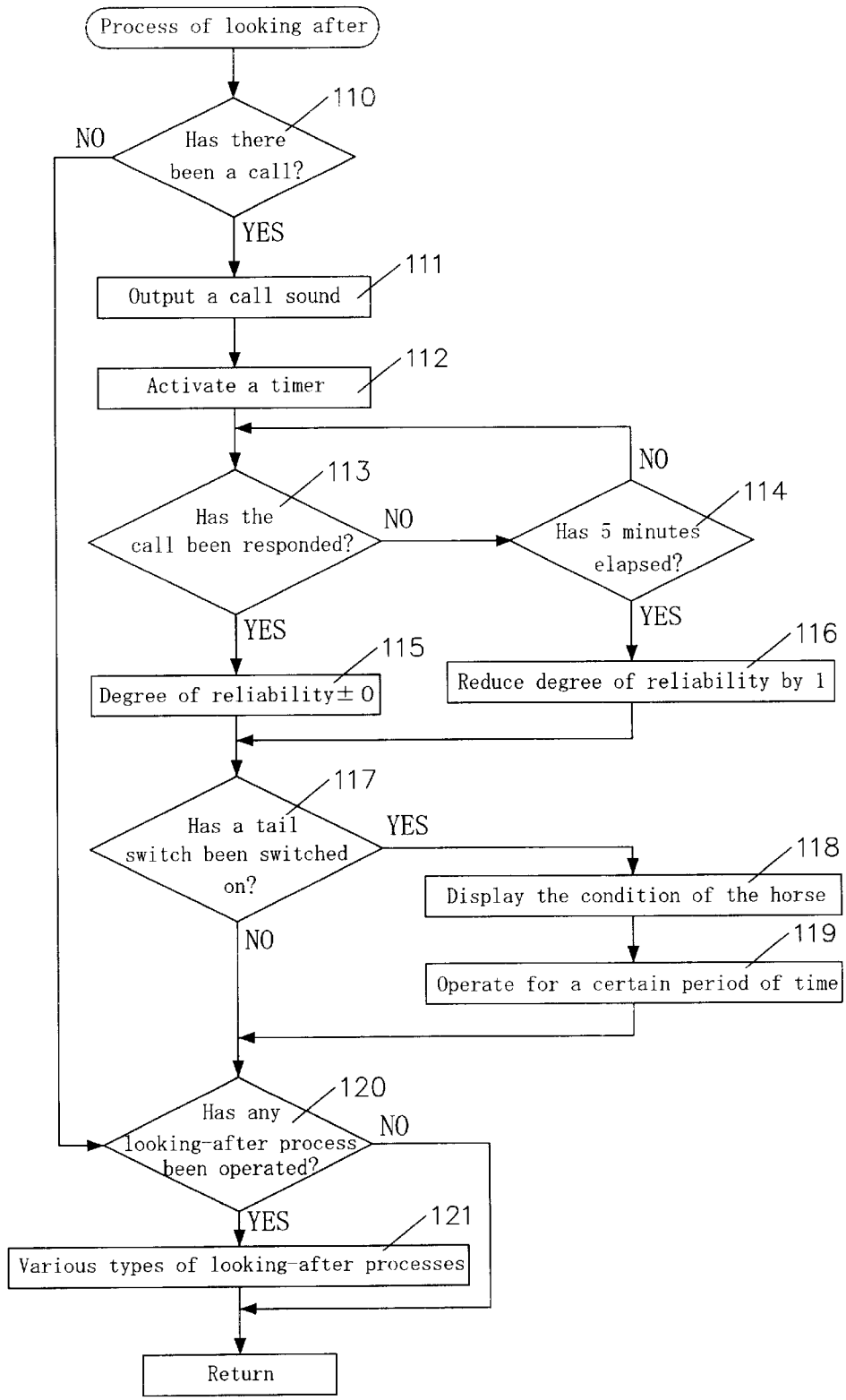
FIG. 3 is a flowchart showing a process of looking after the racehorse as part of the rearing.

The "process of looking after" shown in FIG. 3 as part of the rearing of the racehorse will be described.

It is determined in step 110 whether or not there has been a call from the imaginary living body, and in case there has been a call from the imaginary living body, the flow proceeds to step 111. On the contrary, in case there has been no call, the flow proceeds to step 120. In step 111, in order to call the player, a buzzer sound is generated from the sound/voice output means for a certain period of time to inform the player that he or she is called by the imaginary living body, and in step 120 the timer is activated to clock a time required before the player responds to the call. It is determined in step 113 whether or not the player has responded to the call, and in addition it is determined in step 114 whether or not the player has managed to respond to the call within 5 minutes. In case the player has managed to respond the call within 5 minutes after the call was made, there occurs no change in reliability between the player and the imaginary living body, but in case the player has not managed to respond to the call at all or within 5 minutes, the reliability between the player and the imaginary living body is reduced by 1 point.

The degree of reliability between the player and the imaginary living body is divided into four stages; a type A denotes that the reliability is serious (firm), a type B denotes that the reliability is fairly serious (fairly firm), a type C denotes that the reliability is ordinary (ordinarily firm) and a type D denotes that the reliability is not serious (weak), and the degree of the reliability influences hungriness and cleanliness, wake-up time, sleeping time, frequency at which the racehorse gets sulky, frequency at which the racehorse falls into a nap, and frequency at which the racehorse gets ill, as well as the growth in capability of the racehorse.

In addition, the player is called by the racehorse depending upon the conditions of the racehorse such as when it gets "hungry," "sleepy," "dirty," and "sulky," and the player responds to the call by "feeding the racehorse," "letting the racehorse sleep," "washing the racehorse," and "communicating with the racehorse" to thereby keep the reliable relationship with the racehorse.

It is determined in step 117 whether or not the player has operated the tail switch SW4. In case the player has operated the tail switch SW4, the flow proceeds to step 118 where the current condition of the racehorse is displayed on the display means, and the operating means is operated for a certain period of time in the following step. As this occurs, the operating speed is changed in on the order of three stages depending upon the conditions of the racehorse, and the player is informed of the condition of the racehorse.

Figure 11A:
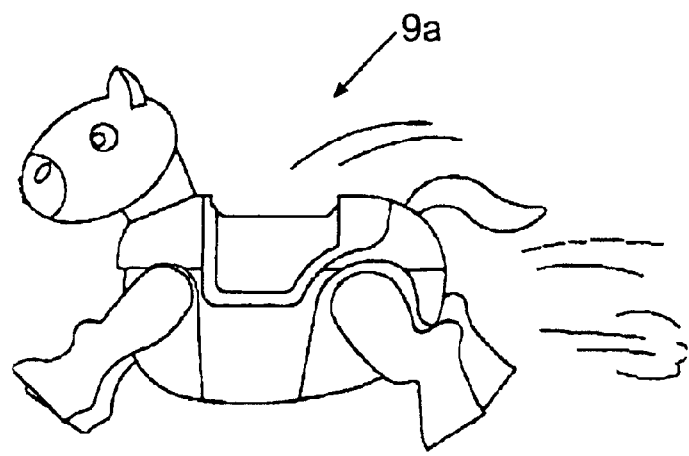
FIGS. 11A–11C are diagrams showing that a rearing simulation apparatus informs a player of conditions of an imaginary living body.
Figure 11B:
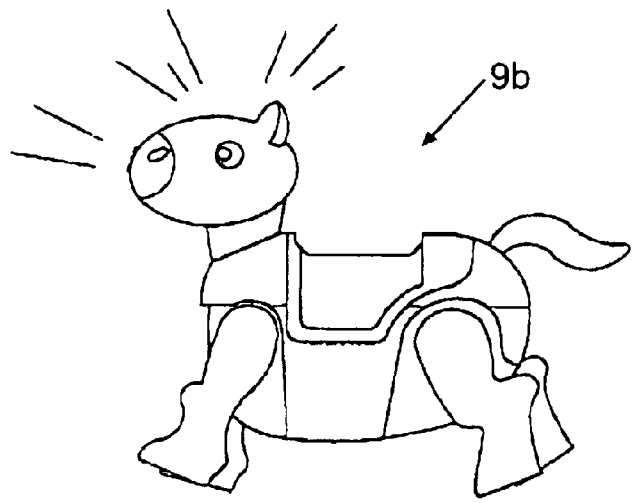
Figure 11C:
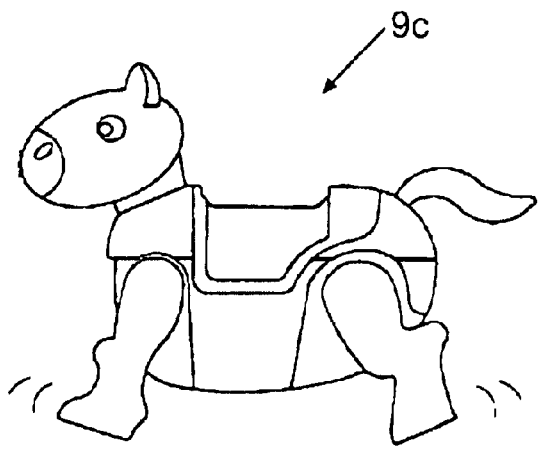

FIGS. 11A–11C show how the rearing simulation apparatus informs the player of the condition of the racehorse. When the player operates the tail switch SW4, in order to inform the player of the current condition of the racehorse, the operating speed of the leg portions of the rearing simulation apparatus is changed in on the order of three stages depending upon the conditions of the racehorse. In the embodiment of FIG. 11A, a case where the imaginary living body is in a good condition 9a, the leg portions are operated at a high speed. In the embodiment of FIG. 11B, a case where the racehorse is in a normal condition 9b, the leg portions are operated at an intermediate speed. In the embodiment of FIG. 11C, a case where the racehorse is in a bad condition 9c, the leg portions are operated at a low speed. Thus, the player can communicate with the racehorse by being informed of the current condition of the imaginary living body. Here, the condition of the imaginary living body includes the conditions of its health and mind, as well as the mood thereof.

While the operating speed of the leg portions is changed in the three stages to inform the player of the condition of the imaginary living body in this embodiment, the operating speed may be made to be zero to stop the operation as long as there is caused a change in operation. Alternatively, the operation speed may be changed continuously.

It is determined in step 120 whether or not the player has done something to look after the racehorse, and in case the player has done something to look after the racehorse, the flow proceeds to step 121. On the contrary, if the player has done nothing to look after the racehorse, the flow proceeds to step 104. In step 121, when the player looks after the racehorse in respective ways, there is caused a change in speed at which the generating rate of calls from the racehorse and various parameters decreases. When the process in this step is completed, the flow returns to step 104.

In addition, the various looking-after parameters include a hungriness parameter, a cleanliness parameter, a napping parameter and a sleeping parameter, and each parameter is designed to decrease by 1 point every time an optional period of time has elapsed. As this occurs, the optional period of time is influenced by the degree of reliability between the player and the racehorse or the character of the racehorse. In a case where the degree of reliability is high or the racehorse is serious in character, the optional period of time is set long, and the speed at which the respective parameters decrease gets slow. On the contrary, in a case where the degree of reliability is low or the racehorse is not serious in character, the optional period of time is set short, and the speed at which the respective parameters decrease gets fast. Furthermore, in case any of the parameters becomes zero, the player is designed to be called.

In step 120, when the player performs the respective looking-after processes to increase the respective parameters by 1 point, the generation of calls from the racehorse can be prevented and the reliable relationship between the player and the racehorse can be maintained or enhanced.

Figure 12:
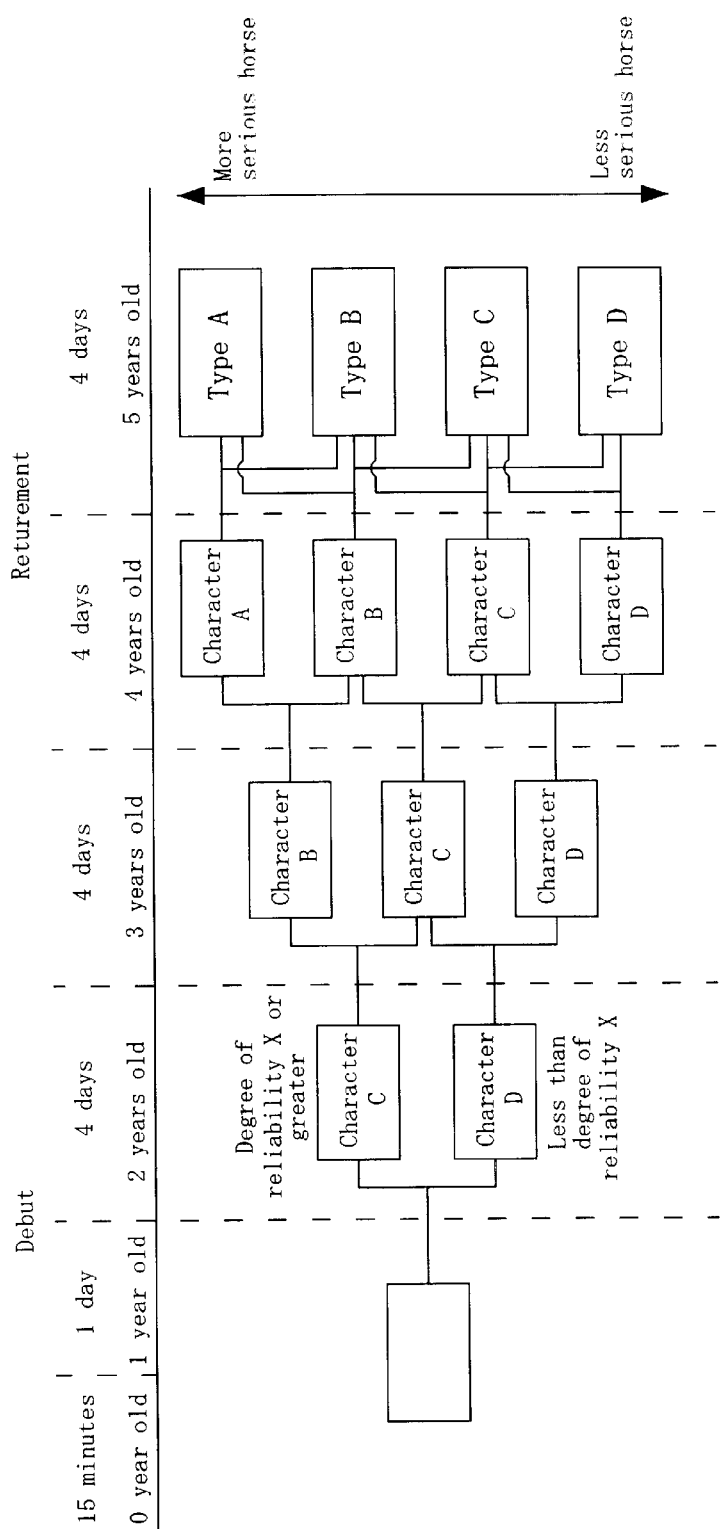
FIG. 12 is a chart showing a change in the nature of the racehorse.

In addition, the respective looking-after processes can be implemented at every age under the "process of looking after." Furthermore, the character of the racehorse is determined as shown in FIG. 12 by the extent to which the racehorse is looked after in this process of looking after. For example, the racehorse is not looked after sufficiently when it is 0 to 1 year old, in other words, the degree of reliability between the player and the racehorse is low, the racehorse adopts a "Character D," and becomes an unserious racehorse. On the contrary, in case the degree of the reliability is high, the racehorse adopts a "Character C," and becomes a racehorse having a slightly bad character. As the racehorse gets older, the character thereof is divided into four stages in seriousness ranging from a type A, a serious racehorse, to a type D, an unserious racehorse. The character of the racehorse is influenced by the extent to which the player looks after the racehorse, and the more frequently the player looks after the racehorse, the better character the racehorse adopts.

Figure 4:
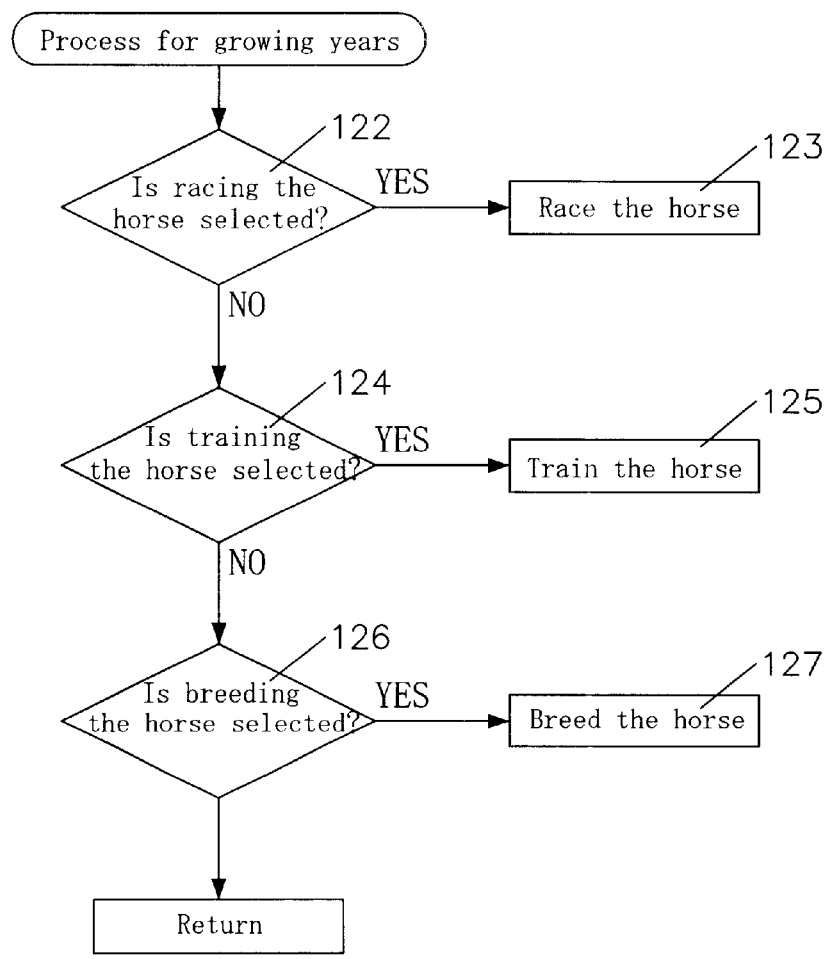
FIG. 4 is a flowchart showing a process of growing the racehorse as part of the rearing.

A "process for growing years" shown in FIG. 4 as part of the rearing of the racehorse will be described.

In this process for growing years, there occurs three main events: a "racing 123," a "training 125," and a "breeding 127."

It is determined in step 122 whether or not the player selects the racing 123. In case the player selects the racing, the flow proceeds to the "racing 123," and on the contrary, in case the player does not select the racing, the flow then proceeds to step 124.

It is then determined in step 124 whether or not the player selects the training 125. In case the player selects the training, the flow proceeds to the "training 125," and on the contrary, in case the player does not select the training, the flow proceeds to step 126.

It is determined in step 126 whether or not the player selects the breeding 127. In case the player selects the breeding, the flow proceeds to the "breeding 127," and on the contrary, if the player does not select the breeding, the flow returns to step 110 in the process of looking after.

Figure 5:
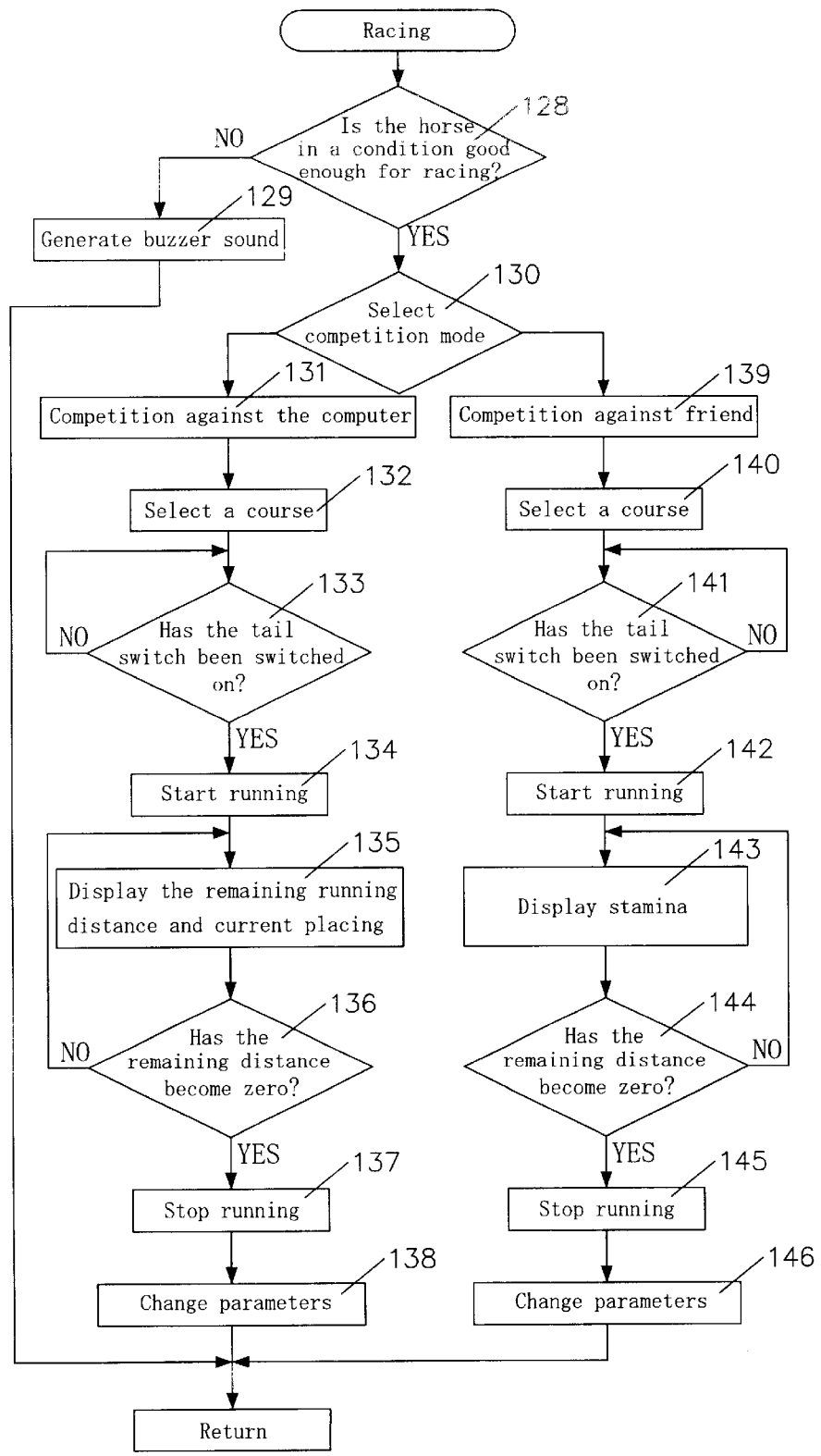
FIG. 5 is a flowchart showing a process of racing the racehorse as part of the rearing.

The "racing" shown in FIG. 5 as part of the rearing will be described.

In the "racing," the player can select either of a "competition against the computer 131," and a "competition against a friend racehorse 139."

Firstly, it is determined in step 128 whether or not the racehorse is in a condition good enough for racing. In case it is determined that the racehorse is in a condition good enough for racing, the flow proceeds to step 130. On the contrary, it is determined that the racehorse is not in a condition good enough for racing, the flow proceeds to step 129. In case the racehorse is ill, for example, the racehorse cannot participate in any race. In step 129 buzzer sound is generated for a certain period of time from the sound/voice generating means to inform the player that the racehorse cannot participate in the race. Thereafter, the flow returns to step 124.

When the player is to race the racehorse, the player selects either of the "competition against the computer" in which the player can play alone and the "competition against a friend racehorse" in which two or more players can play together. In case the player selects the competition against the computer, the flow then proceeds to step 131, and on the contrary, in case the player selects the competition against a friend racehorse, the flow proceeds to step 139.

In the competition against the computer in step 131, the player can play along and judges the results of the rearing of the racehorse and the capability of the racehorse by competing against imaginary racehorses.

Then, the flow proceeds to step 132, where the player selects a racing course from a short distance of 120 cm, an intermediate distance of 180 cm and a long distance of 240 cm. A distance over which the rearing simulation apparatus is caused to run in reality is determined by the selection of the racing course. Then, the flow proceeds to step 133.

It is determined in step 133 whether or not the player has operated the tail switch SW4 of the rearing simulation apparatus. In case the player is determined to have operated the switch, the flow proceeds to step 134. In addition, a wait condition continues until the player operates the tail switch SW4.

Figure 13:
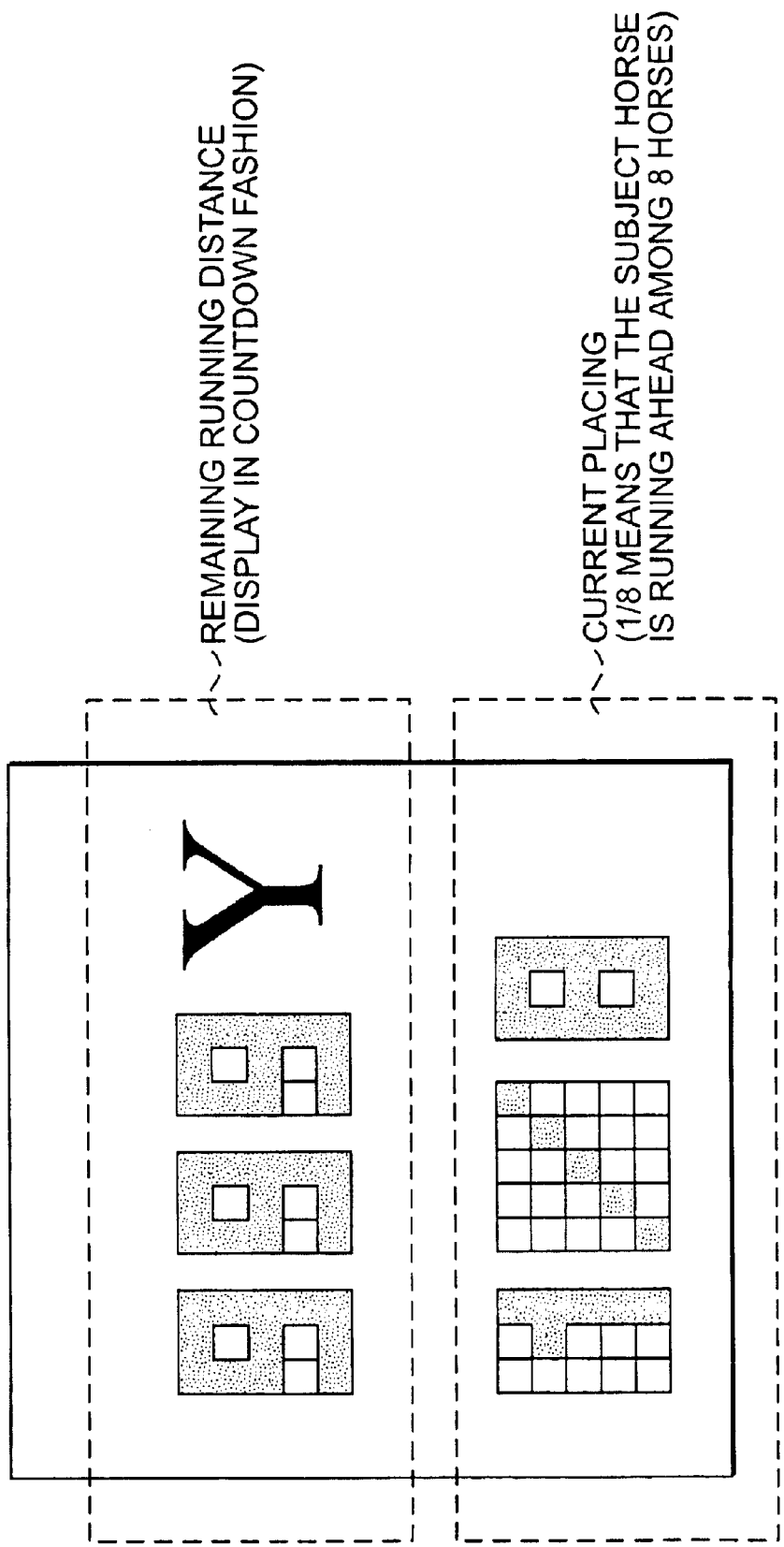
FIG. 13 is a display that is displayed while the rearing simulation apparatus competes against the computer.

In step 134 the apparatus main body activates the operating means to start running, and in step 135 the remaining running distance and the current placing of the race horse against the contending racehorses are displayed on the display means. FIG. 13 shows the contents of a display that are displayed during the competition against the computer in which the remaining running distance is displayed at an upper part of the display as, for example, 999Y (yards), whereas at a lower part of the display the current placing of the racehorse is displayed. For example, the placing is displayed as "1/8" which means that the subject racehorse is running ahead among the eight racehorses.

It is determined in step 136 whether or not the remaining running distance becomes zero, and the remaining running distance and the placing continue to be displayed until the remaining running distance becomes zero. When the remaining running distance becomes zero, the flow proceeds to step 137.

In step 137 the racing completes, the operation of the operating means is stopped, and the competition against the computer is over. In step 138 capability parameters related to the physical strength of the racehorse are changed after the race to the result thereof. Thereafter, the flow returns to step 124.

In the competition against friend racehorses in step 139, the player starts his or her racehorse mainly together with racehorses of the other contending players to compete with one another with respect the time taken before the racehorses arrive at the goal. FIG. 14 shows running distances over which the racehorses are made to run for competition in the play. As shown in the figure, the course is selected from the short distance 10a of 120 cm, the intermediate distance 10b of 180 cm and the long distance 10c of 240 cm. A distance over which the rearing simulation apparatus is made to run in reality is determined by so selecting the course, and it is desirable that the distance is normally set equally among the contending racehorses.

In addition, While the course is selected from three courses of distance in this embodiment, the optional distance may be designed to be set by the player. Alternatively, the operation or running may be stopped only when an operation stop switch for stopping the operation/running is pushed by the player.

It is determined in step 141 whether or not the player has operated the tail switch SW4 of the rearing simulation apparatus, and in case the player is determined to have operated the switch, the flow proceeds to step 134. In addition, the wait condition is designed to continue until the player operates the tail switch SW4. It is desirable that the tail switch is operated at the same timing as those at which the other players operate the tail switches of their own rearing simulation apparatuses.

In step 142 the apparatus main body activates the operating means to start running, and in step 143 the remaining stamina of the racehorse is displayed on the display means. The player can be informed of the remaining stamina of his or her own racehorse by looking at the display of the stamina on the display means. In addition, the remaining running distance is also counted simultaneously.

It is determined in step 144 whether or not the remaining running distance becomes zero, and the display of stamina continues until the remaining running distance becomes zero. In case the remaining running distance becomes zero, the flow proceeds to step 145.

In step 145 the race is over, the operating means stops operating, and the competition against friend racehorses completes. This is the goal of the play, and the racehorse who has covered the set running distance first becomes a winner of the game. Thus, the player of the subject racehorse can judge the rearing result of his or her own racehorse against the rearing results of the racehorses of the other players. In addition, in step 146 the capability parameters related to the physical strength of the racehorse are changed after the race to the result thereof. Thereafter, the flow returns to step 124.

Figure 6:
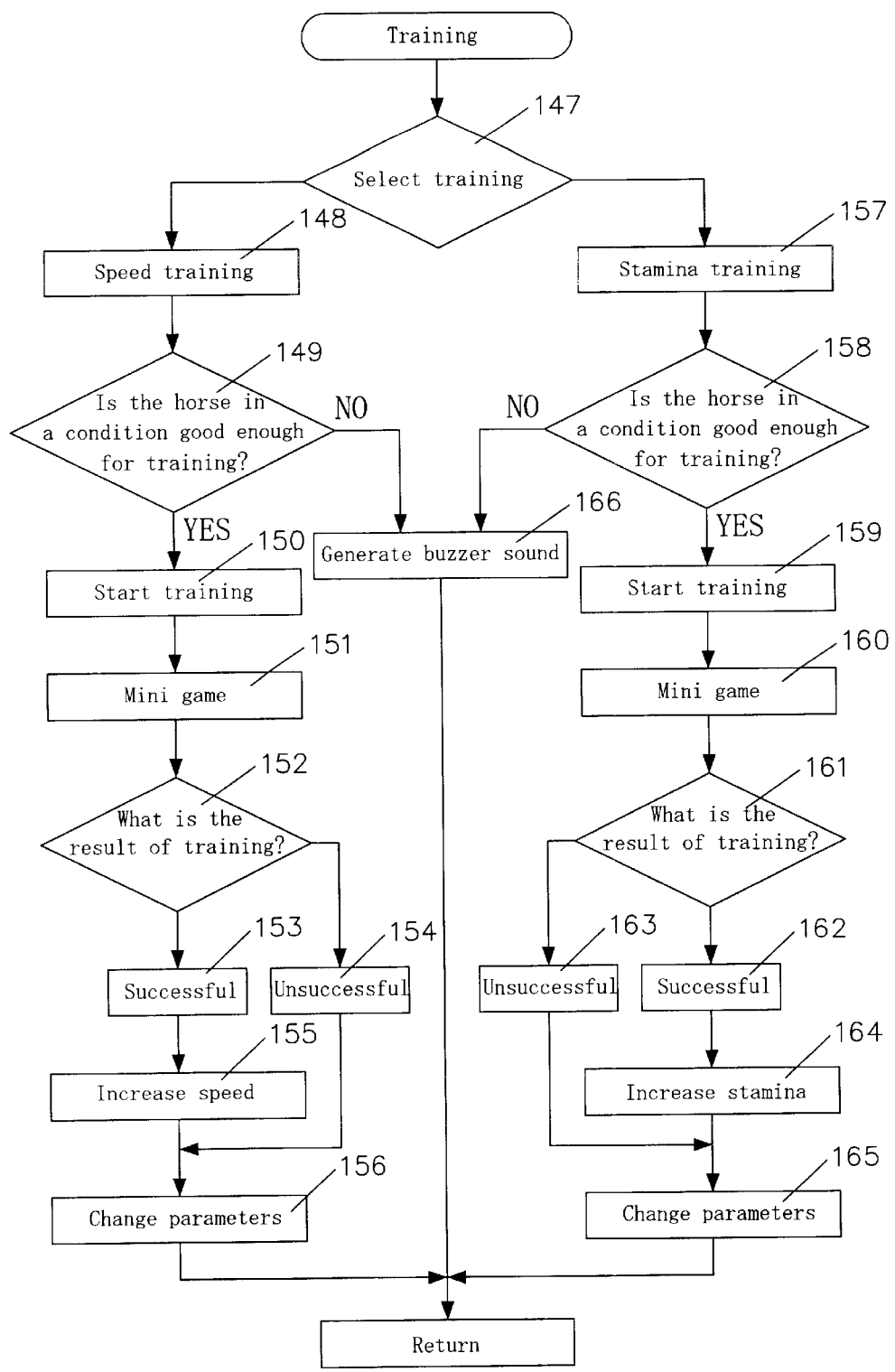
FIG. 6 is a flowchart showing a process of training the racehorse as part of the rearing.

The "training" shown in FIG. 6 as part of the rearing will be described.

In the "training," the player can select mainly either a "speed training 148," or a "stamina training 157."

The player selects either of the two types of the trainings in step 147. When the player selects the speed training, the flow proceeds to step 148, whereas the player selects the stamina training, the flow proceeds to step 157.

The speed training is implemented in step 148. It is determined in step 149 whether or not the racehorse is in a condition good enough for the training. In case the racehorse is ill or the like, the training cannot be implemented. In case the training cannot be implemented, the flow proceeds to step 166, where buzzer sound continues to be generated for a certain period of time from the sound/voice generating means, and the flow then returns to step 126.

In case the racehorse is determined to be good enough for the training in step 149, then the flow proceeds to step 150, where the training is started. In step 151 the player plays a mini game. In step 152 the results of the training is determined from the result of the mini game, and in case the result of the mini game is good, the flow proceeds to step 153. On the contrary, in case the result of the mini game is not successful, the flow proceeds to step 154.

The successful result is displayed on the display means in step 153. On the contrary, the unsuccessful result is displayed on the display means in step 154. The capability of the racehorse related to speed is enhanced in step 155. In addition, parameters related to the physical strength of the racehorse are decreased due to the implementation of the training in step 156.

Similarly to the speed training, even with the stamina training, it is determined in step 158 whether or not the racehorse is in a condition good enough for the stamina training. In case the racehorse is ill or the like, the selected training cannot be carried out. In case the selected training cannot be carried out, the flow proceeds to step 166, where buzzer sound continues to be generated for a certain period of time from the sound/voice generating means, and then the flow returns to step 126.

In case the racehorse is determined to be in the condition good enough for the training, the flow proceeds to step 159 to start the training. The player plays a mini game in step 160. The result of the training is determined from the result of the mini game in step 161, and in case the result of the mini game is successful, the flow proceeds to step 162. On the contrary, in case the result of the mini game is unsuccessful, the flow proceeds to step 163.

The successful result is displayed on the display means in step 162. On the contrary, the unsuccessful result is displayed on the display means in step 163. The capability of the racehorse related to speed is enhanced in step 164. In addition, parameters related to the physical strength of the racehorse are decreased due to the implementation of the training in step 165.

Figure 7:
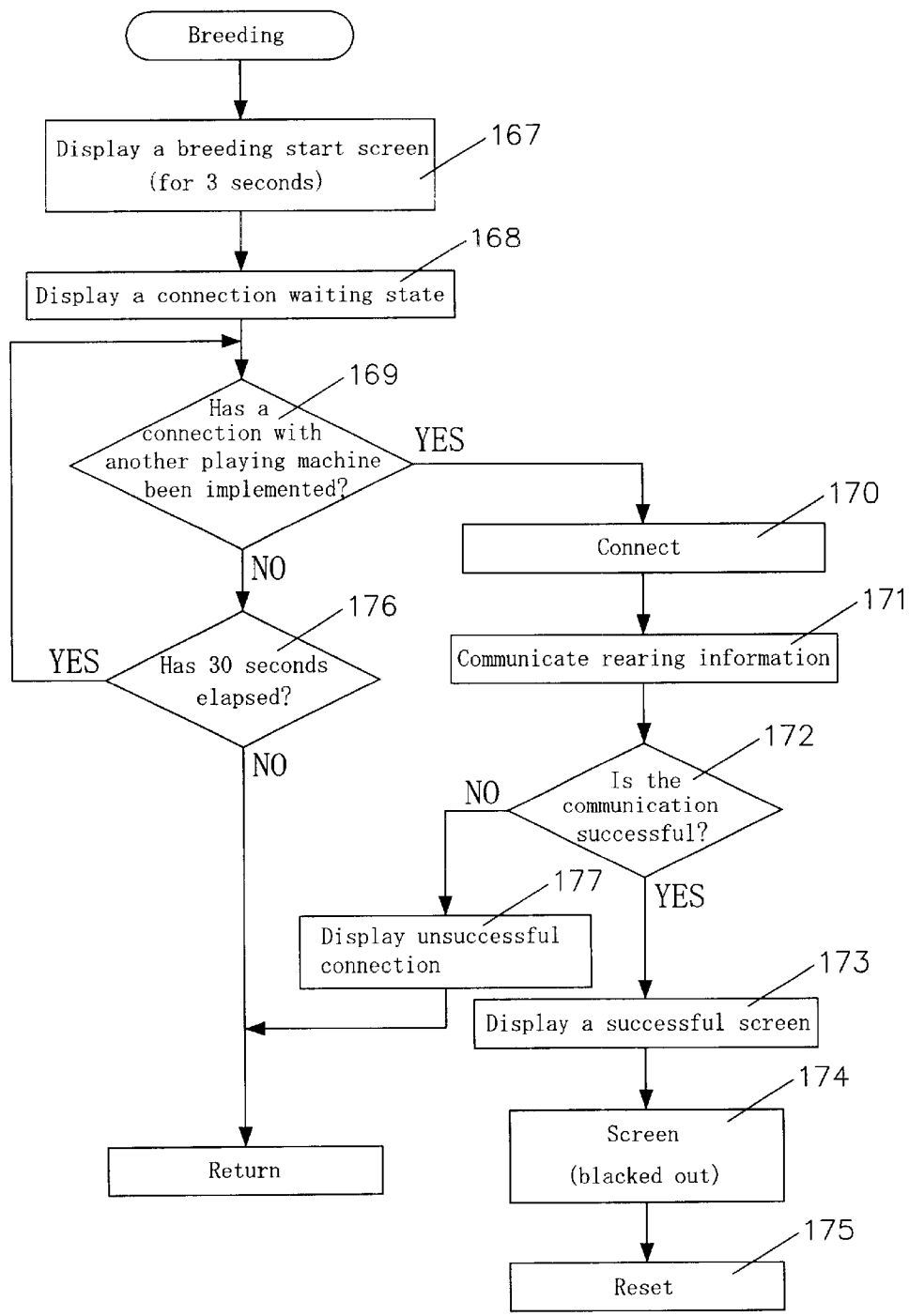
FIG. 7 is a flowchart showing a process of breeding as part of the rearing.

The "breeding" shown in FIG. 7 as part of the rearing will be described.

In the "breeding," the rearing simulation apparatus is connected to a different rearing simulation apparatus to communicate rearing information with the different rearing simulation apparatus, whereby an imaginary racehorse succeeding the racehorse that has been reared is born. The succeeding imaginary racehorse is reconstructed based on the rearing information on the racehorse that has been reared and the rearing information from the different imaginary racehorse, and therefore the rearing information from both the racehorses is inherited to the succeeding imaginary racehorse. In addition, the age information is reset as zero year old, and rearing starts again from the beginning.

The flow of breeding will be described.

The start of breeding is displayed on the screen in step 167. Thereafter, it is displayed in step 168 that a connection is waited for. It is determined in step 169 whether or not the rearing simulation apparatus is connected with a different rearing simulation apparatus, and at the same time it is determined in step 176 whether or not thirty seconds has elapsed. In case the rearing simulation apparatus is connected with the different rearing simulation apparatus within thirty seconds, the flow proceeds to step 170. On the contrary, in case the rearing simulation apparatus is not connected with the different rearing simulation apparatus within thirty seconds, the flow returns to the "process of looking after."

The rearing simulation apparatus is connected with the different rearing simulation apparatus in step 170, and the respective rearing simulation apparatuses communicate respective rearing information between the apparatuses in step 171. It is determined in step 172 whether or not the communication of the rearing information has been successful. In case the communication is determined to have been successful, the flow proceeds to step 173. On the contrary, the communication is not successful, the flow proceeds to step 177.

The unsuccessful connection is displayed on the screen in step 177. The flow thereafter proceeds to the step of the "process of looking after." On the contrary, the successful communication of the rearing information is displayed on the screen in step 173, and the flow proceeds to step 174. The screen is blacked out (displayed black) in step 174, and the flow proceeds to step 175, where a reconstruction is implemented based on the respective rearing information.

In addition, the breeding information is modified by the speed capability parameter at this point in time. For example, assuming that there exists a racehorse of type A having a maximum value of 12 for the speed of the racehorse, in case the speed capability parameter value of the reared racehorse is 10 or greater, type A continues to be maintained as it is, and on the contrary, in case the speed capability parameter value is less than 10, the type of the racehorse is ranked down to become type B. In other words, in case breeding can be implemented in a state in which the player has reared the racehorse sufficiently, the current status is maintained to be inherited to the succeeding racehorse. On the contrary, in case the rearing has not been implemented sufficiently, the type is ranked down.

In addition to this, as shown in FIG. 15, the type of the succeeding racehorse is changed and determined by the type of a racehorse to which the racehorse that has been reared is connected. For example, in a case where breeding is implemented between a racehorse of type A and a racehorse of type C, the type of a succeeding racehorse becomes type B. In addition, in a case where breeding is carried out between a racehorse of type C and a racehorse of type D, the type of a succeeding racehorse becomes type D. Thus, this is used as a basic parameter of a succeeding racehorse.

Additionally, as shown in FIG. 16, the maximum value of the capability parameter of a succeeding racehorse increases generation after generation (that is, depending upon the number of times of implementations of breeding). For example, in the case of a second generation (after the breeding is implemented for the first time), with a succeeding racehorse of type A, the maximum value for the speed capability parameter of the second generation is increased to 18 from the maximum value of 12 for the speed capability parameter of the first generation. With the type of a succeeding racehorse remaining the same, which is type A, the maximum value for the speed capability parameter becomes 24. Thus, the maximum value of the capability increases generation after generation. After a final maximum value for the capability is determined thereafter, the racehorse is reset to initialize the information of the racehorse such as its age.

Figure 8:
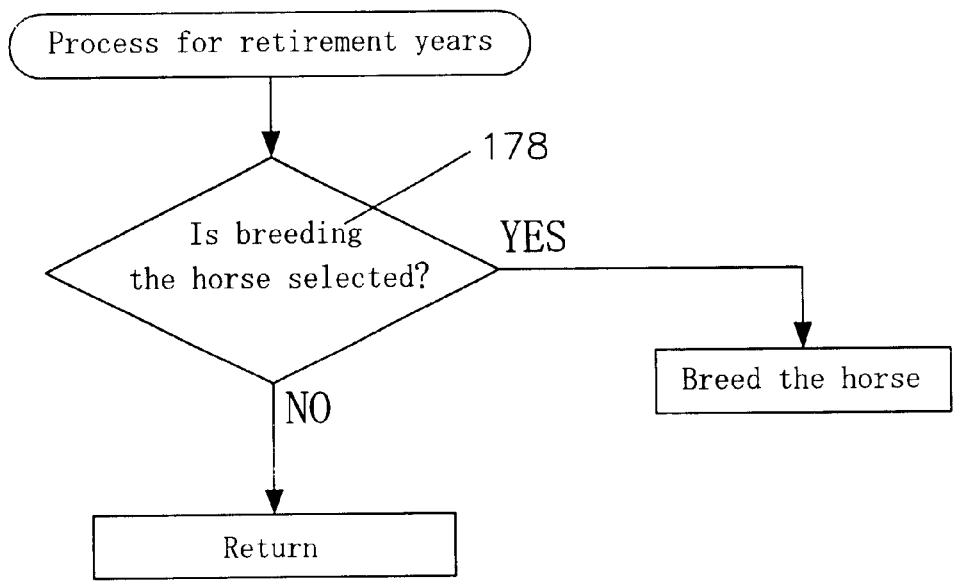
FIG. 8 is a flowchart showing a process of retiring the racehorse as part of the rearing.

The "process for retirement years" shown in FIG. 8 as part of the rearing will be described.

The "breeding" is a main event that is to be carried out in the "process for retirement years," and it is determined in step 178 whether or not a breeding is implemented. In case it is determined that a breeding is implemented, the flow returns to step 127, whereas, on the contrary, it is determined that no breeding is implemented, the flow returns to the "process of looking after."

Referring to FIGS. 17a to 21, an embodiment of the construction of the rearing simulation apparatus according to the present invention will be described next.

Figure 17A:
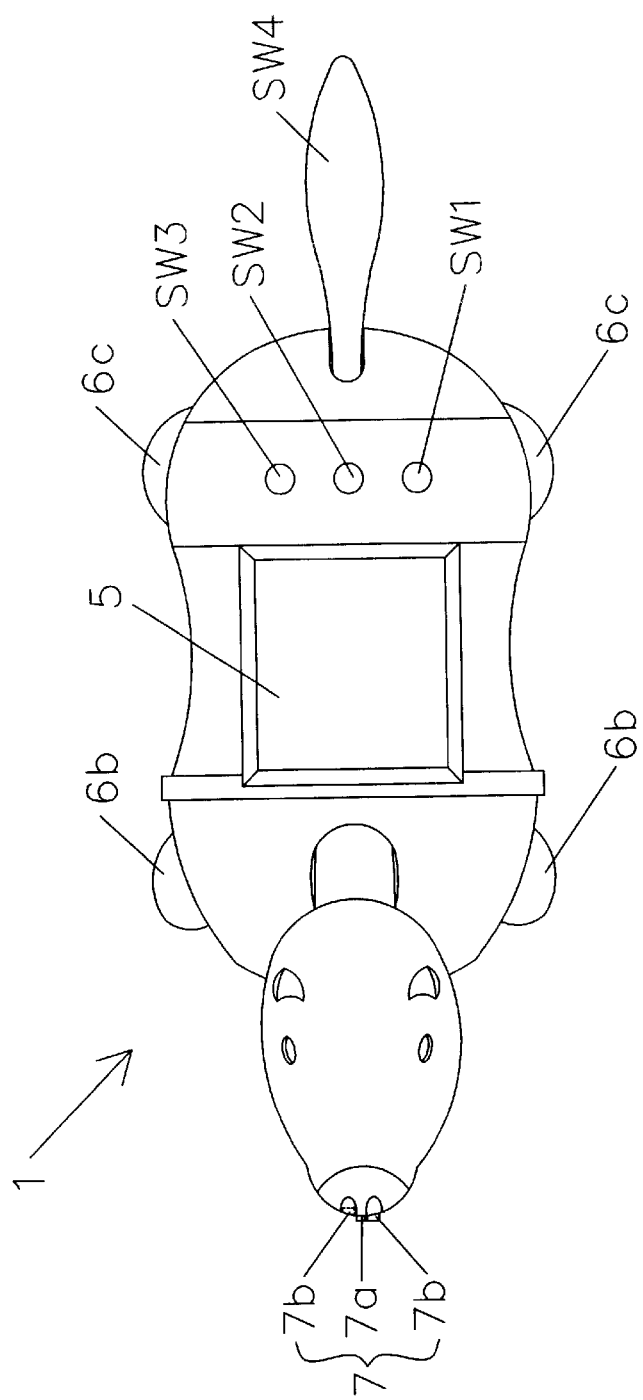
FIG. 17a is a plan view of an external appearance of an embodiment of the rearing simulation apparatus.
Figure 17B:
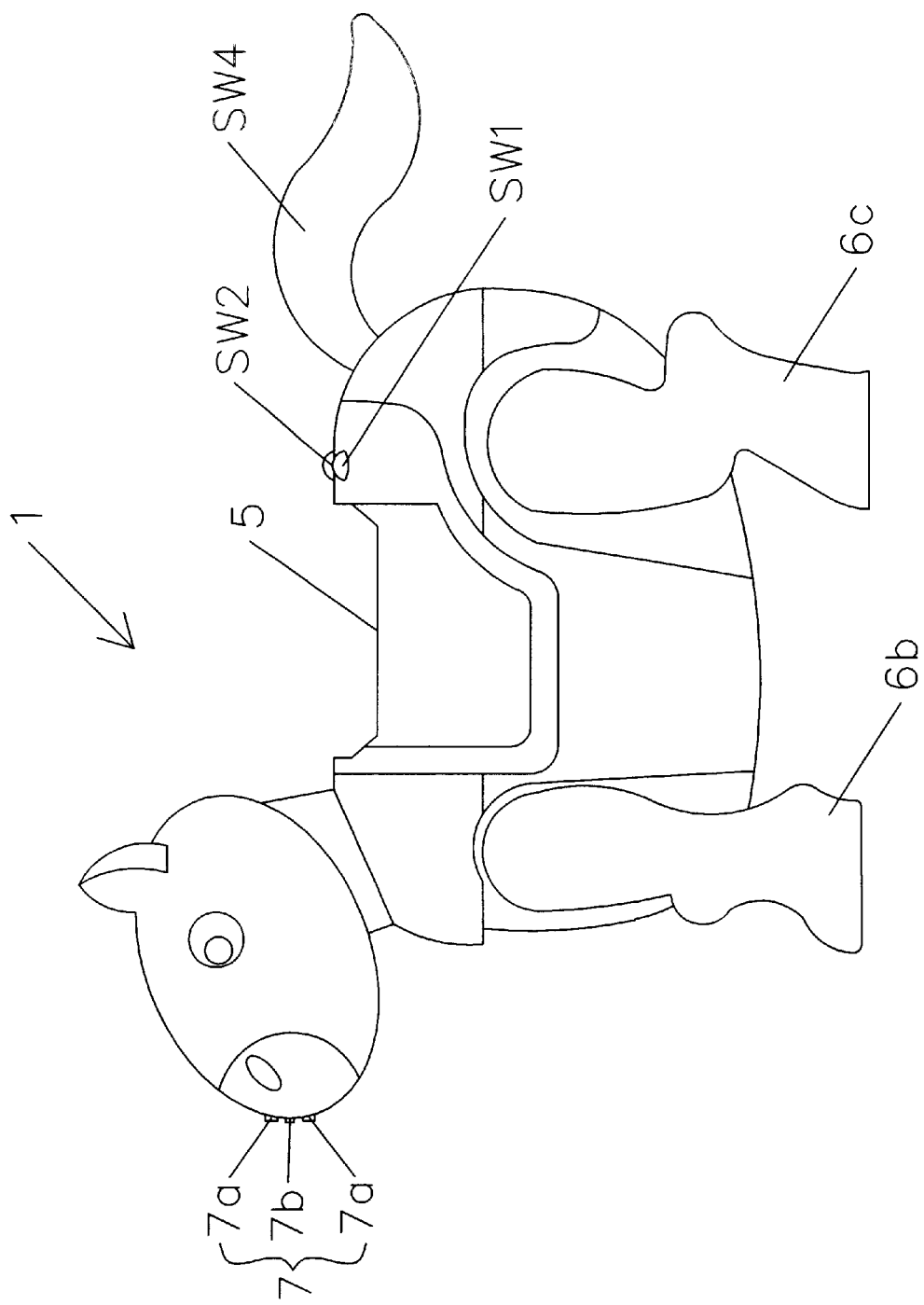
FIG. 17b is a side view of the external appearance of then embodiment of the rearing simulation apparatus.

FIGS. 17a and 17b show an embodiment of the apparatus main body 1 according to the present invention, in which the external appearance thereof is formed so as to imitate that of a racehorse. A liquid crystal screen is disposed on the apparatus main body 1 as the display means 5, and switches SW1, SW2, SW3, SW4 are provided at the hip portion as input means. In addition, two movable front leg portions 6b and two movable rear leg portions 6c are provided on the apparatus main body 1, whereby the rearing simulation apparatus is allowed to run by swinging these leg portions. Additionally, a connecter terminal 7a and a guide pin 7b are disposed at a nose portion of the apparatus main body 1 which is formed into a configuration of the nose as a connecting means 7 for connecting the rearing simulation apparatus with a different rearing simulation apparatus.

While the movable portions for effecting the running of the rearing simulation apparatus are formed into the leg configuration in this embodiment, any other means may be used as long as it can move the rearing simulation apparatus which means includes tires, caterpillars, hovercraft, linear motors, screws and propellers.

The racehorse may be designed to perform actions such as moving the head vertically, turning the head horizontally or wagging the tail.

FIG. 18 shows charts indicating changes in the operating speed of the rearing simulation apparatus. The racehorse has a capability to change the operating speed of the operating means, and in a case where the player makes the rearing simulation apparatus run a certain distance, the charts indicate that the distance is roughly divided into three portions from the start to end of running for changing the running speed during running.

The speed of the dashing type racehorse is designed to change such that it runs at fast speed for a first half but the running speed gets slower thereafter. On the contrary, the speed of the last spurt type racehorse is designed to change such that it runs at slow speed for the first half but the running speed gets gradually faster toward a latter half. In addition, the speed of the fickle type racehorse is designed to change such that it can change its running speed at random.

While the running distance is described as being roughly divided into three portions in this embodiment, the running distance may be divided into two or more portions from the start to end of running. Alternatively, the running distance does not necessarily have to be divided but the operating speed may be designed to change freely.

Figure 19:
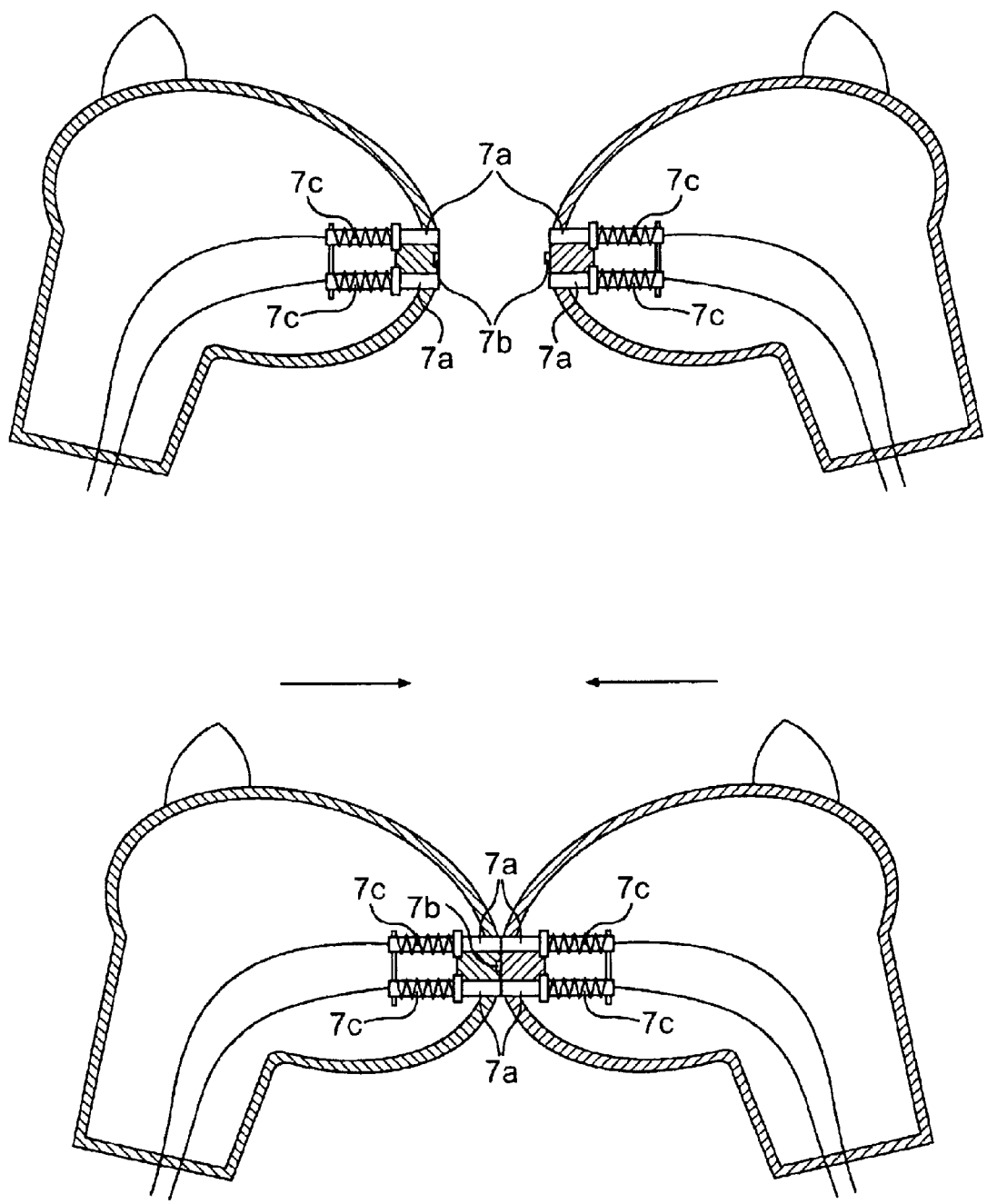
FIG. 19 shows how to connect the rearing simulation apparatus with another rearing simulation apparatus.

FIG. 19 shows a state in which the rearing simulation apparatus is connected with a different rearing simulation apparatus. Two connector terminals 7a are provided at the nose-like formed nose portion of the rearing simulation apparatus which imitates a racehorse as connecting means 7 for connecting with the different rearing simulation apparatus. The connector terminals 7a are each constituted by an electric conductor and are disposed such that the terminals protrude partly from the nose portion in such a manner as to be moved in a direction in which they sink into the nose portion. Coil springs 7c are provided for restoring the connector terminals 7a to their initial mounting positions in a case where the connector terminals 7a are pressed in the direction in which the terminals sink into the nose portion. Furthermore, an irregularly shaped guide pin 7b is provided for assisting in connection of the connector terminals 7a with the connector terminals 7a of the different rearing simulation apparatus so that the connector terminals 7a are connected with each other when the guide pins 7b of the respective rearing simulation apparatuses are fitted in each other.

When the players fittingly contact the guide pins 7b disposed at the nose portions of their own rearing simulation apparatuses with those of the corresponding rearing simulation apparatuses, the protruding ends of the connector terminals 7a are pressed against each other to establish electric connection therebetween so that the same electric connection is established between the rearing simulation apparatus and the corresponding different rearing simulation apparatus, whereby rearing information can be communicated between the two apparatuses.

While the rearing information is communicated between the rearing simulation apparatus and the different rearing simulation apparatus through the electric connection in this embodiment, any other means may be used as long as the communication of the information can be implemented even in such a non-contact fashion as using ultra-red rays, radio waves, light and magnetism.

In addition, in a case where the imaginary living body is certain years of old, when the player connects the own rearing simulation apparatus that he or she has reared with a different rearing simulation apparatus, the rearing simulation apparatus communicates the rearing data of its own imaginary living body and the rearing data of the different imaginary living body with the different rearing simulation apparatus. In a case where the communication is completed normally, a new imaginary living body is born, and generations are changed. The rearing data of the imaginary living body and the rearing data of the different imaginary living body are then inherited to the new born imaginary living body.

Figure 20A:
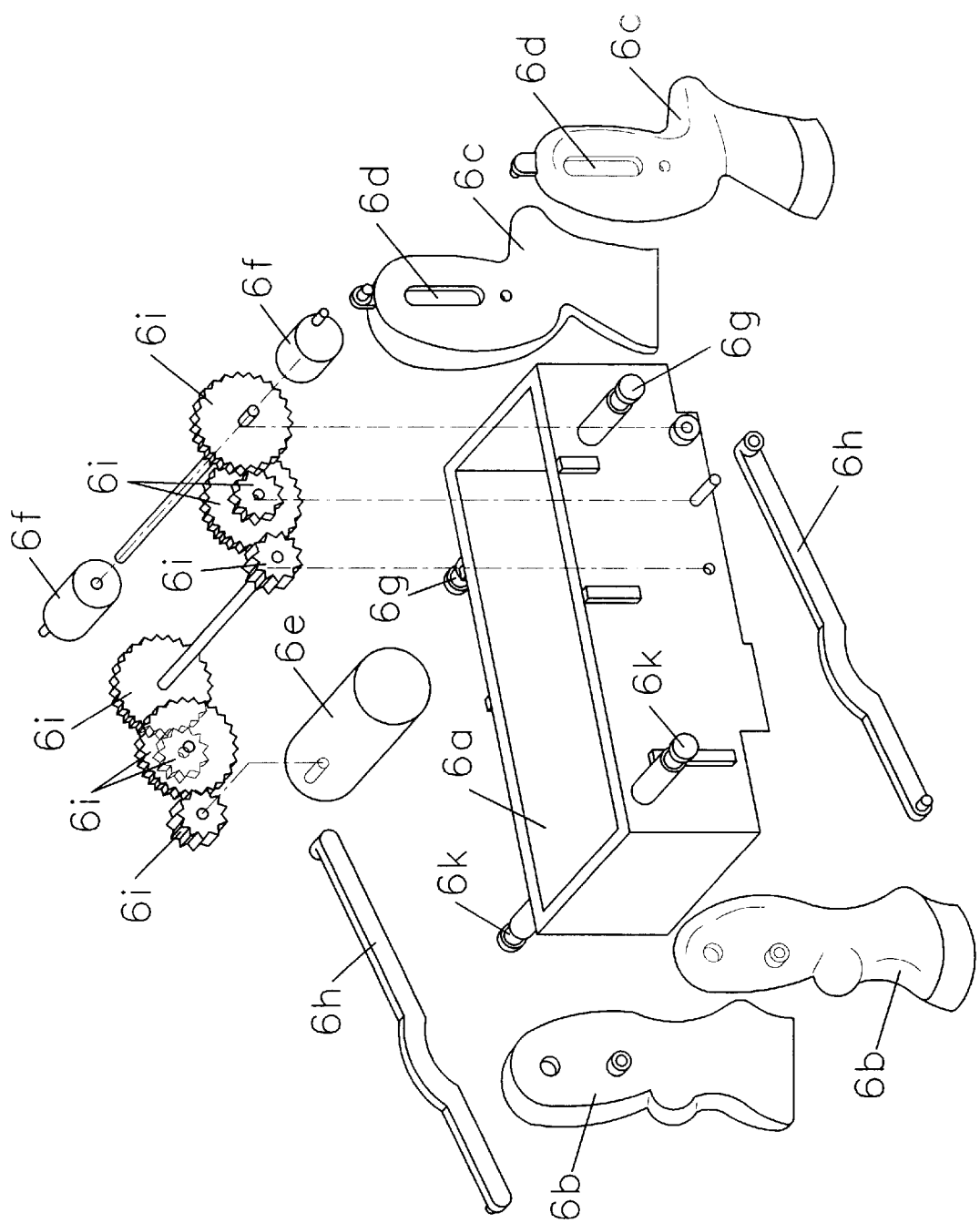
FIG. 20a is an exploded perspective view of the operating mechanism of the rearing simulation apparatus.

FIG. 20a is an exploded perspective view of an operating mechanism of the rearing simulation apparatus. The operating mechanism comprises a motor 6e, gears 6i, shafts, a battery box 6a, front leg portions 6b and rear leg portions 6c.

Figure 20B:
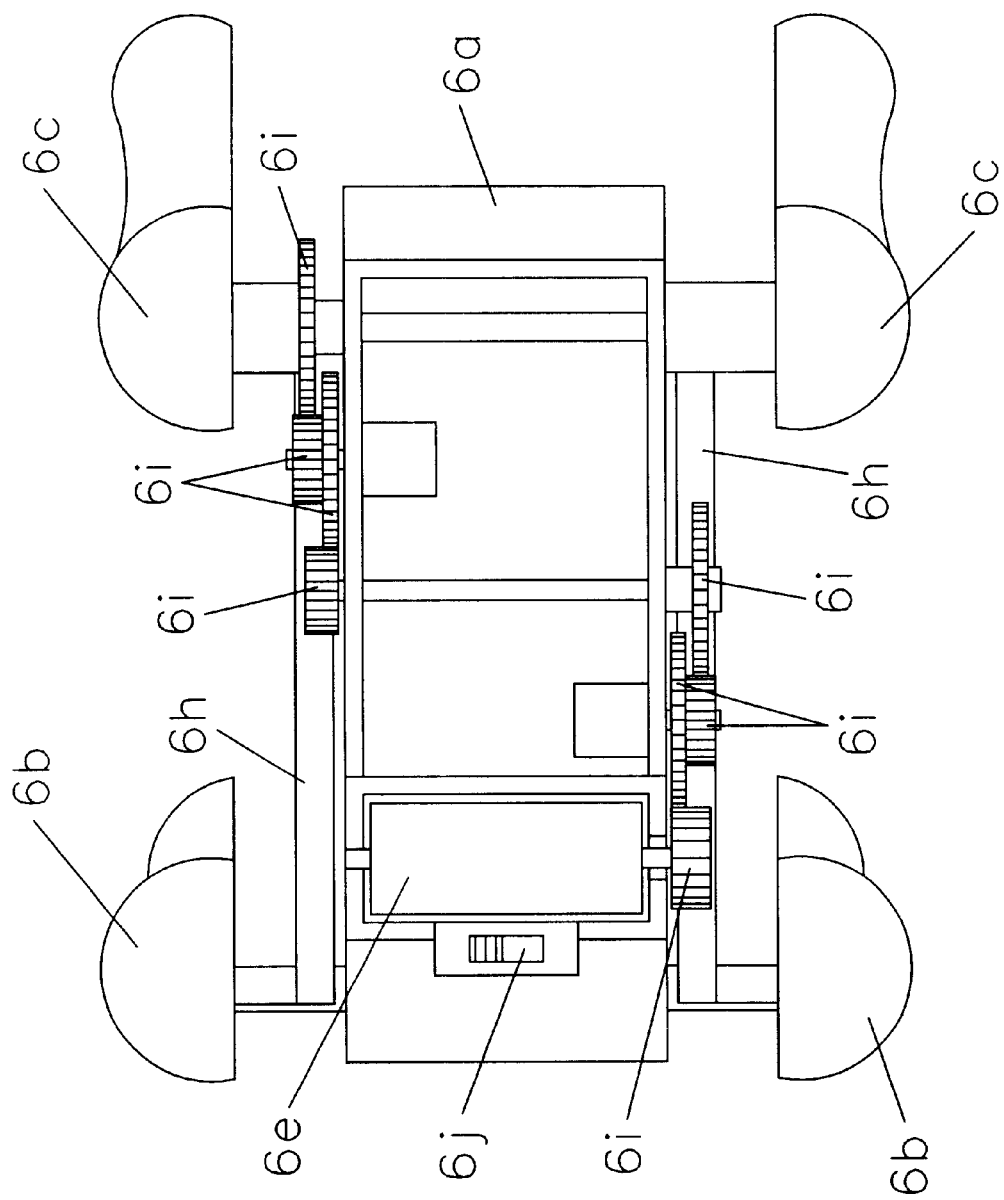
FIG. 20b is a view of the operating mechanism of the rearing simulation apparatus as viewed from below.

In addition, FIG. 20b is a view of the operating mechanism of the rearing simulation apparatus as viewed from below, in which the motor 6e is mounted on a lower surface of the battery box 6a, and the gears 6i are mounted on a rotating shaft of the motor 6e. Gears 6i for reducing the rotating speed of the motor 6e are rotatably supported on the battery box 6a at a plurality of positions in such a manner as to be brought into engagement with the gears 6i on the rotating shaft of the motor 6e to thereby transmit rotations of the motor 6e to cams 6f for driving the leg portions 6c. In addition, an operation stop switch is provided on the bottom surface of the battery box 6a.

Figure 20C:
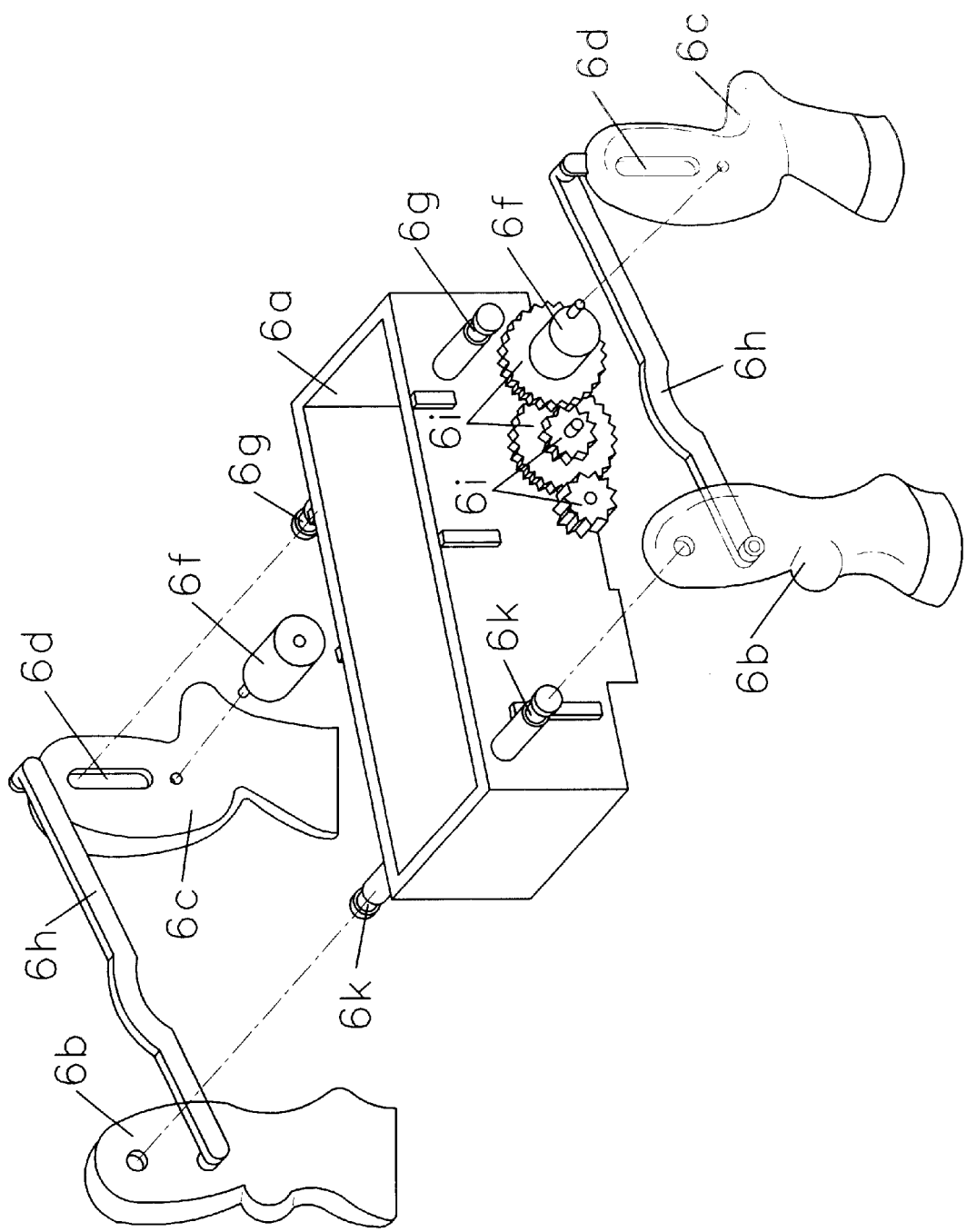
FIG. 20c is a view showing the state in which the operating mechanism is partly built up.

Additionally, FIG. 20c is an exploded perspective view showing a state in which the operating mechanism of the rearing simulation apparatus is partly built up.

The operation of the operating mechanism will be described. The rotations of the motor 6e is transmitted from the motor 6e to the cam 6f, and the rear leg portion 6c performs circular motions by virtue of rotations of the cam 6f. However, a stationary shaft 6g fixed to the battery box 6a is inserted into an elongate hole formed in the rear leg portion 6c, whereby the elongate hole in the rear leg portion 6c slides to the stationary shaft 6g. As this occurs, the rear leg portion 6c is oriented toward a straight direction in which the stationary shaft 6g is connected with the axis of the cam 6f, whereby the rear leg portion 6c operates to swing the rear leg portion longitudinally to the rotations of the cam 6f.

The front leg portions 6b are rotatably supported on a stationary shaft 6k fixed to the battery box 6a and have operating pieces 6h connected to the rear leg portions 6c, whereby the rear leg portions 6c are swung longitudinally, and as this occurs, the front leg portions 6b connected to the operating pieces 6h move forward when the rear leg portions move rearward, and on the contrary, the front leg portions 6b move rearward when the rear leg portions 6c operate to move forward.

Leg portions are similarly provided on an opposite side across the battery box 6a. However, the rear leg portions 6c are provided in such a manner as to move alternately by opposing the rotating position of the cam 6f to that on the opposite side across the battery box 6a. Namely, this is true with the front leg portions 6b, and the front leg portions also operate alternately. The four leg portions are designed to be moved with the driving force from the single motor 6e, whereby the operating mechanism of the rearing simulation apparatus is provided.

While there is provided the single motor 6e for operation of the operating mechanism in this embodiment, there may be provided two motors 6e for operation of the front leg portions 6b and the rear leg portions 6c, respectively. Alternatively, there may be provided four motors 6e for operation of each leg portion. The increase in the number of motors to be provided may be preferred since the dramatic effects of the rearing simulation apparatus can be increased. The installation of the operating mechanism within the rearing simulation apparatus enables the rearing simulation apparatus to run.

Figure 21:
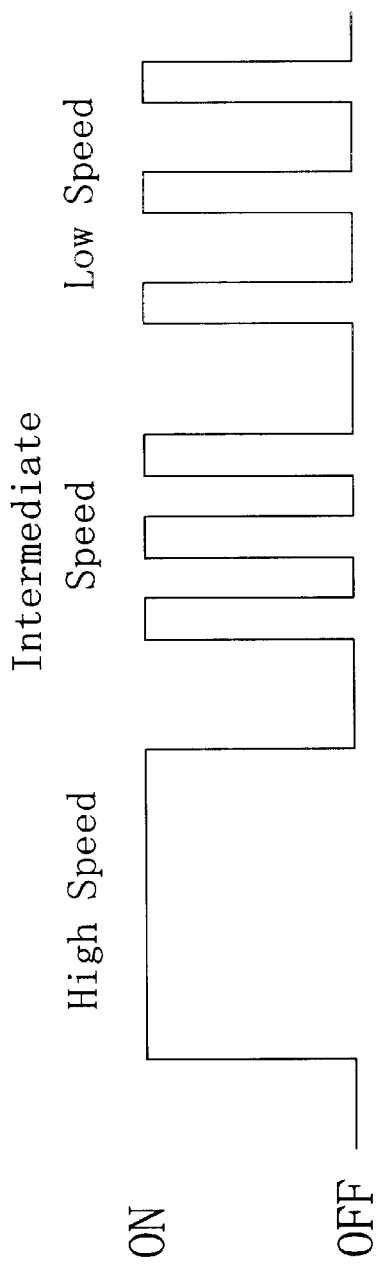
FIG. 21 is a diagram showing a method for changing the operating speed of the rearing simulation apparatus.

In addition, while in this embodiment, with a view to the operating speed of the operating mechanism is varied as shown in FIG. 21, a power supply to the motor 6e is switched ON and OFF based on information processed by the CPU. For example, in order to operate the operating mechanism at high speed, the operating mechanism is allowed to operate at high speed with the power supply being normally switched on. In order to operate the operating mechanism at intermediate speed, the operating mechanism is allowed to operate at intermediate speed with the power supply being switched on intermittently.

Furthermore, in order to operate the operating mechanism at low speed, the operating mechanism is allowed to operate at low speed with the power supply being switched on intermittently at longer intervals.

Instead, a stepping motor may be used as the motor 6e to vary the operating speed of the operating mechanism. In addition, the operating speed of the operating mechanism may be varied by exchanging the positions of the gears 6i within the operating mechanism.

Note that the rearing simulation apparatus according to the present invention is not limited to the aforesaid embodiment but may be modified, of course, in various ways without departing the sprit and scope of the present invention.

The following advantages can be provided by the rearing simulation apparatus as set forth in the first to tenth aspects of the present invention, which have been described heretofore.

According to the present invention, the operating means is allowed to operate based on the results of the rearing of the imaginary living body, whereby the rearing simulation apparatus can be provided which dramatically produces further rearing pleasure for the player.

Additionally, according to the present invention, in operating the rearing simulation apparatus, the operating speed thereof can be varied, whereby the rearing simulation apparatus can be provided which dramatically produces further rearing pleasure for the player.

Furthermore, according to the present invention, the legs or tires are provided on the rearing simulation apparatus for allowing the same apparatus to move or run, whereby the rearing simulation apparatus can be provided which dramatically produces further rearing pleasure for the player.

Moreover, according to the present invention, when the player runs the rearing simulation apparatus, the player can run the same apparatus the optional distance, whereby the rearing simulation apparatus can be provided which dramatically produces further rearing pleasure for the player.

In addition, according to the present invention, when the player runs the rearing simulation apparatus the optional distance, the operating speed of the same apparatus can be varied from the start to end of the optional distance, whereby the rearing simulation apparatus can be provided which dramatically produces further rearing pleasure for the player.

Furthermore, according to the present invention, when the player operates the confirmation switch in order to confirm the condition of the imaginary living body, the rearing simulation apparatus informs the player of the various conditions of the imaginary living body through the predetermined actions so that the player can confirm the condition of the imaginary living body, whereby the rearing simulation apparatus can be provided which dramatically produces further rearing pleasure for the player.

Moreover, according to the present invention, the player can rear and grow the imaginary living body and can determine the degree of growth of the imaginary living body by making the imaginary living body so reared and grown computer compete against the different imaginary living body stored in the memory means, whereby the rearing simulation apparatus can be provided which dramatically produces further rearing pleasure for the player.

Additionally, according to the present invention, by connecting the two rearing simulation apparatuses, imaginary living bodies can be renewed generation after generation while the information on the two imaginary living bodies are retained, whereby the rearing simulation apparatus can be provided which dramatically produces further rearing pleasure for the player.

Furthermore, according to the present invention, the operation of the operating means of the imaginary living body can be stopped optionally, whereby the rearing simulation apparatus can be provided which dramatically produces further rearing pleasure for the player.

Moreover, according to the present invention, the imaginary living body is formed such that the external appearance thereof imitates a horse, and the motor is used as the operating means, so that the imaginary living body becomes friendly to the player, whereby the rearing simulation apparatus can be provided which dramatically produces further rearing pleasure for the player.

What is claimed is:

1. A rearing simulation apparatus comprising rearing means for rearing an imaginary living body and input means for implementing the rearing of said imaginary living body, wherein a player responds to and deals with appeals or requests from said imaginary living body to take care of or train said imaginary living body for growing the same, input means for rearing operation of said imaginary living body, memory means for memorizing control data related to the rearing of said imaginary living body, control means is operable to input and output to said memory means based on an input signal from said input means, image display means is operable to display said rearing information related to said imaginary living body and operating means operable by information obtained from said control means; wherein requests types and frequency of the requests types from the imaginary living body are defined by the reliability of the players responsiveness.

2. A rearing simulation apparatus as set forth in claim 1, wherein said operating means is operable to add variety to an operating speed by said information obtained from said control means.

3. A rearing simulation apparatus as set forth in claim 1, wherein an external appearance of said rearing simulation apparatus is formed to a figured matter providing leg portions or tires so as to make said apparatus movable.

4. A rearing simulation apparatus as set forth in claim 1, wherein said input means is operable to input an optional distance information and said operating means executes said optional distance by setting the number of times of operation of said imaginary living body by operating said input means.

5. A rearing simulation apparatus as set forth in claim 1, wherein said operating means is operable to vary said operating speed by results of simulation based on control signal from said control means and a capability characteristic for varying said operating speed.

6. A rearing simulation apparatus as set forth in claim 1, wherein said input means includes a switch for conferring the condition of said imaginary living body, said control means for receiving said input signal of the switch, said operating means is activated by control signal of said operating means and sound generating means for informing the condition of said imaginary living body by activating signal of said operating means.

7. A rearing simulation apparatus as set forth in claim 1, wherein a plurality of said rearing simulation apparatus are mutually connected and includes connecting means capable a computer match, said one rearing simulation apparatus reared and grown and another rearing simulation apparatus operating on automatic control by said control means.

8. A plurality of rearing simulation apparatus as set forth in claim 7, wherein clocking means is operable to allow aging of said imaginary living body to said rearing simulation apparatus, said memory means for memorizing age of said imaginary simulation apparatus, said one rearing simulation apparatus and said another rearing simulation apparatus comprises a communication function to said connecting means capable of connection, said memory means for memorizing information of both said imaginary living body obtained from the results of transmission and reception by connecting both said rearing simulation apparatus, and said connecting means is capable of varying an optional age from said age memorized in said memory means.

9. A rearing simulation apparatus as set forth in claim 1, wherein said rearing simulation apparatus comprise operation stopping means for stopping the operation of said operating means.

10. A rearing simulation apparatus as set forth in claim 1, wherein the external appearance of said rearing simulation apparatus is formed to imitate a racehorse, and wherein said operating means comprises a motor on power spring.

* * * * *